(12) United States Patent
Wermter et al.

(10) Patent No.: US 7,723,412 B2
(45) Date of Patent: May 25, 2010

(54) STABILIZATION OF THERMOPLASTIC NANOCOMPOSITES

(75) Inventors: Hendrik Wermter, Bensheim (DE); Rudolf Pfaendner, Rimbach (DE)

(73) Assignee: Ciba Specialty Chemicals Corporation, Tarrytown, NY (US)

( * ) Notice: Subject to any disclaimer, the term of this patent is extended or adjusted under 35 U.S.C. 154(b) by 787 days.

(21) Appl. No.: 10/542,045

(22) PCT Filed: Jan. 8, 2004

(86) PCT No.: PCT/EP2004/000068

§ 371 (c)(1),
(2), (4) Date: Jul. 13, 2005

(87) PCT Pub. No.: WO2004/063268

PCT Pub. Date: Jul. 29, 2004

(65) Prior Publication Data

US 2006/0122308 A1 Jun. 8, 2006

(30) Foreign Application Priority Data

Jan. 15, 2003 (EP) .................................. 03405011

(51) Int. Cl.
  *C08K 5/52* (2006.01)
  *C08K 5/134* (2006.01)
  *C08K 3/34* (2006.01)
(52) U.S. Cl. ........................ 524/151; 524/291; 524/445; 524/570; 525/120
(58) Field of Classification Search ................. 524/186, 524/445, 447, 151, 291, 570; 525/120
See application file for complete search history.

(56) References Cited

U.S. PATENT DOCUMENTS

| | | | |
|---|---|---|---|
| 5,973,053 A | 10/1999 | Usuki et al. ................... 524/445 |
| 6,197,849 B1 | 3/2001 | Zilg et al. .................... 523/216 |
| 6,251,980 B1 | 6/2001 | Lan et al. ..................... 524/445 |
| 6,291,567 B1 | 9/2001 | Nakaura et al. ............. 524/412 |
| 6,414,070 B1 * | 7/2002 | Kausch et al. ............... 524/445 |
| 6,472,460 B1 | 10/2002 | Okamoto et al. ............ 524/445 |
| 7,084,197 B2 * | 8/2006 | Chin et al. ...................... 524/99 |
| 7,220,484 B2 * | 5/2007 | Ton-That et al. ............. 428/407 |
| 7,371,793 B2 * | 5/2008 | Gong et al. ................... 524/445 |
| 2005/0004294 A1 | 1/2005 | Chin et al. .................... 524/445 |
| 2005/0215691 A1 | 9/2005 | Muhlebach et al. ......... 524/445 |

FOREIGN PATENT DOCUMENTS

| | | |
|---|---|---|
| EP | 0 908 490 | 4/1999 |
| EP | 1 193 290 | 4/2002 |
| JP | 04-68133 | * 10/1993 |
| JP | 05-271481 | * 10/1993 |
| JP | 2000-212408 | 8/2000 |
| JP | 2001-26724 | 1/2001 |
| WO | 99/42518 | 8/1999 |
| WO | 01/05879 | 1/2001 |
| WO | WO 01/05880 A1 * | 1/2001 |
| WO | 01/66627 | 9/2001 |
| WO | 01/88035 | 11/2001 |
| WO | 02/079318 | 10/2002 |
| WO | WO 03/002651 | * 1/2003 |

OTHER PUBLICATIONS

Irgonox Product Information Brochure, CIBA Specialty Chemicals, 2000.*
Patent Abstracts of Japan, Publication No. 05-271481, Oct. 19, 1993.
English Abstract An-1994:136260 for JP 5271481, Oct. 19, 1993.
Patent Abstracts of Japan, Publication No. 10120753, May 12, 1998.
Patent Abstracts of Japan, Publication No. 10204152, Aug. 4, 1998.
English Abstract AN-1990:21866 for JP 1188543, Jul. 27, 1989.
Patent Abstracts of Japan, Publication No. 01-261458, Oct. 18, 1989.
Patent Abstracts of Japan, Publication No. 02069513, Sep. 6, 1988.
English Abstract AN-1992:265643 [32] of JP 4183709, Jun. 30, 1992.
English Abstract AN-1987:318657 [45] of JP 62227921, Oct. 6, 1987.
Patent Abstracts of Japan, Publication No. 07-109409, Apr. 25, 1995.
Dr. Hans Zweifel, Plastics Additives Handbook, 5th Edition, pp. 901-948, (2001) no month indicated.
Michael Alexandre et al., Materials Science and Engineering, vol. 28, pp. 1-63, (2000) no month indicated.
Masaya Kawasumi et al., Macromolecules, vol. 30, pp. 6333-6338, (1997) no month indicated.

* cited by examiner

*Primary Examiner*—Vickey Nerangis
(74) *Attorney, Agent, or Firm*—Tyler A. Stevenson

(57) ABSTRACT

The instant invention discloses a nanocomposite material comprising (a) a synthetic polymer, (b) a natural or synthetic phyllosilicate or a mixture of such phyllosilicates in nanoparticles, (c) a phenolic antioxidant and/or a processing stabilizer, and (d) a mono or polyfunctional compound selected from the class consisting of the epoxides, oxazolines, oxazolones, oxazines, isocyanates and/or anhydrides.

10 Claims, No Drawings

STABILIZATION OF THERMOPLASTIC NANOCOMPOSITES

The present invention relates to a nanocomposite material comprising (a) a synthetic polymer, especially a polyolefin, (b) a natural or synthetic phyllosilicate or a mixture of such phyllosilicates in nanoparticles, (c) a phenolic antioxidant and/or a processing stabilizer, and (d) a mono or polyfunctional compound selected from the class consisting of the epoxides, oxazolines, oxazolones, oxazines, isocyanates and/or anhydrides, and to the use of components (b), (c) and (d) as stabilizers for synthetic polymers against oxidative, thermal or light-induced degradation.

The addition of fillers to organic materials, especially polymers, is known and is described for example in Hans Zweifel (editor), Plastics Additives Handbook, 5th Edition, pages 901-948, Hanser Publishers, Munich 2001. The use of fillers in polymers has the advantage that it is possible to bring about improvement in, for example, the mechanical properties, especially the density, hardness, rigidity (modulus) or reduced shrinkage of the polymer.

Using extremely small filler particles (<200 nm), so-called nano-scaled fillers, mechanical properties, heat distortion temperature stability or flame retardant property of the polymers can be improved at a much lower concentration of 2 to 10% by weight compared to 20 to 50% by weight with the micro-scaled normal filler particles. Polymers containing nano-scaled fillers combine favourable mechanical properties like strength, modulus and impact, and show improved surface qualities like gloss, lower tool wear at processing and better conditions for recycling. Coatings and films comprising nano-scaled fillers show improved stability, flame resistance, gas barrier properties and scratch resistance.

Nano-scaled fillers possess an extremely large surface with high surface energy. The deactivation of the surface energy and the compatibilization of the nano-scaled fillers with a polymeric substrate is, therefore, even more important than with a common micro-scaled filler in order to avoid aggregation during processing or conversion of the filled polymer and to reach an excellent dispersion of the nano-scaled filler in the final article.

There is a substantial recent literature on organic-inorganic nanocomposites based on clays or layered silicates such as montmorillonite and synthetic polymers. Polyolefin nanocomposites have been prepared from organic modified clays. The clays used are generally modified with long chain alkyl or dialkyl ammonium ions or amines or in a few cases other onium ions, like for example phosphonium. The ammonium ion/amine additives are usually incorporated into the clay structure by a separate solution intercalation step.

These conventional organic modified clays have a number of disadvantages when used for the preparation of polyolefin nanocomposites. Ammonium salts are thermally unstable at temperatures used in polyolefin processing or may be otherwise reactive under processing conditions. These instabilities result in poor processing stability, inferior mechanical properties, discoloration, odor formation and reduced long-term stability in addition to the formation of volatile by-products.

In order to improve the polyolefin nanocomposite formation by melt processing the use of an additional compatibilizer has been proposed, most often a maleic anhydride grafted polypropylene, which in working examples is present as major component of the final product.

M. Kawasumi et al., Macromolecules 1997, 30, 6333-6338 or U.S. Pat. No. 5,973,053 disclose that a polypropylene nanocomposite is obtained when a clay, premodified with octadecylammonium salts, is compounded with polypropylene in the presence of polyolefin oligomers containing polar functionality, for example maleic anhydride grafted polypropylene.

Although compatibilizers can improve the stability of nanocomposites mainly with regard to avoiding agglomeration of the filler, the other weaknesses of the nanocomposites are not improved.

It has now been found that improved nanocomposites with a better long term thermostability, with reduced odor and reduced undesired discoloration, which occurs as a result of the decomposition of the modification agents, can be prepared by the additional use of a mixture comprising a phenolic antioxidant and/or a processing stabilizer, and a mono or polyfunctional compound selected from the class consisting of the epoxides, oxazolines, oxazolones, oxazines, isocyanates and/or anhydrides The present invention therefore provides a nanocomposite material comprising
  a) a synthetic polymer,
  b) a natural or synthetic phyllosilicate or a mixture of such phyllosilicates in nanoparticles,
  c) a phenolic antioxidant and/or a processing stabilizer, and
  d) a mono or polyfunctional compound selected from the class consisting of the epoxides, oxazolines, oxazolones, oxazines, isocyanates and/or anhydrides.

The mixtue of components (c) and (d) is suitable for stabilizing synthetic polymers, especially thermoplastic nanocomposites [components (a) and (b)] against oxidative, thermal or light-induced degradation.

Examples of such materials are:
1. Polymers of monoolefins and diolefins, for example polypropylene, polyisobutylene, polybut-1-ene, poly-4-methylpent-1-ene, polyvinylcyclohexane, polyisoprene or polybutadiene, as well as polymers of cycloolefins, for instance of cyclopentene or norbornene, polyethylene (which optionally can be crosslinked), for example high density polyethylene (HDPE), high density and high molecular weight polyethylene (HDPE-HMW), high density and ultrahigh molecular weight polyethylene (HDPE-UHMW), medium density polyethylene (MDPE), low density polyethylene (LDPE), linear low density polyethylene (LLDPE), (VLDPE) and (ULDPE).

Polyolefins, i.e. the polymers of monoolefins exemplified in the preceding paragraph, preferably polyethylene and polypropylene, can be prepared by different, and especially by the following, methods:
  a) radical polymerisation (normally under high pressure and at elevated temperature).
  b) catalytic polymerisation using a catalyst that normally contains one or more than one metal of groups IVb, Vb, VIb or VIII of the Periodic Table. These metals usually have one or more than one ligand, typically oxides, halides, alcoholates, esters, ethers, amines, alkyls, alkenyls and/or aryls that may be either π- or σ-coordinated. These metal complexes may be in the free form or fixed on substrates, typically on activated magnesium chloride, titanium(III) chloride, alumina or silicon oxide. These catalysts may be soluble or insoluble in the polymerisation medium. The catalysts can be used by themselves in the polymerisation or further activators may be used, typically metal alkyls, metal hydrides, metal alkyl halides, metal alkyl oxides or metal alkyloxanes, said metals being elements of groups Ia, IIa and/or IIIa of the Periodic Table. The activators may be modified conveniently with further ester, ether, amine or silyl ether groups. These catalyst systems are usually termed Phillips, Standard Oil Indiana, Ziegler (-Natta), TNZ (DuPont), metallocene or single site catalysts (SSC).

2. Mixtures of the polymers mentioned under 1), for example mixtures of polypropylene with polyisobutylene, polypropylene with polyethylene (for example PP/HDPE, PP/LDPE) and mixtures of different types of polyethylene (for example LDPE/HDPE).

3. Copolymers of monoolefins and diolefins with each other or with other vinyl monomers, for example ethylene/propylene copolymers, linear low density polyethylene (LLDPE) and mixtures thereof with low density polyethylene (LDPE), propylene/but-1-ene copolymers, propylene/isobutylene copolymers, ethylene/but-1-ene copolymers, ethylene/hexene copolymers, ethylene/methylpentene copolymers, ethylene/heptene copolymers, ethylene/octene copolymers, ethylene/vinylcyclohexane copolymers, ethylene/cycloolefin copolymers (e.g. ethylene/norbornene like COC), ethylene/1-olefins copolymers, where the 1-olefin is gene-rated in-situ; propylene/butadiene copolymers, isobutylene/isoprene copolymers, ethylene/vinylcyclohexene copolymers, ethylene/alkyl acrylate copolymers, ethylene/alkyl methacrylate copolymers, ethylene/vinyl acetate copolymers or ethylene/acrylic acid copolymers and their salts (ionomers) as well as terpolymers of ethylene with propylene and a diene such as hexadiene, dicyclopentadiene or ethylidene-norbornene; and mixtures of such copolymers with one another and with polymers mentioned in 1) above, for example polypropylene/ethylene-propylene copolymers, LDPE/ethylene-vinyl acetate copolymers (EVA), LDPE/ethylene-acrylic acid copolymers (EAA), LLDPE/EVA, LLDPE/EAA and alternating or random polyalkylene/carbon monoxide copolymers and mixtures thereof with other polymers, for example polyamides.

4. Hydrocarbon resins (for example $C_5$-$C_9$) including hydrogenated modifications thereof (e.g. tackifiers) and mixtures of polyalkylenes and starch.

Homopolymers and copolymers from 1.)-4.) may have any stereostructure including syndiotactic, isotactic, hemi-isotactic or atactic; where atactic polymers are preferred. Stereoblock polymers are also included.

5. Polystyrene, poly(p-methylstyrene), poly(α-methylstyrene).

6. Aromatic homopolymers and copolymers derived from vinyl aromatic monomers including styrene, α-methylstyrene, all isomers of vinyl toluene, especially p-vinyltoluene, all isomers of ethyl styrene, propyl styrene, vinyl biphenyl, vinyl naphthalene, and vinyl anthracene, and mixtures thereof. Homopolymers and copolymers may have any stereostructure including syndiotactic, isotactic, hemi-isotactic or atactic; where atactic polymers are preferred. Stereoblock polymers are also included.

6a. Copolymers including aforementioned vinyl aromatic monomers and comonomers selected from ethylene, propylene, dienes, nitriles, acids, maleic anhydrides, maleimides, vinyl acetate and vinyl chloride or acrylic derivatives and mixtures thereof, for example styrene/butadiene, styrene/acrylonitrile, styrene/ethylene (interpolymers), styrene/alkyl methacrylate, styrene/butadiene/alkyl acrylate, styrene/butadiene/alkyl methacrylate, styrene/maleic anhydride, styrene/acrylonitrile/methyl acrylate; mixtures of high impact strength of styrene copolymers and another polymer, for example a polyacrylate, a diene polymer or an ethylene/propylene/diene terpolymer; and block copolymers of styrene such as styrene/butadiene/styrene, styrene/isoprene/styrene, styrene/ethylene/butylene/styrene or styrene/ethylene/propylene/styrene.

6b. Hydrogenated aromatic polymers derived from hydrogenation of polymers mentioned under 6.), especially including polycyclohexylethylene (PCHE) prepared by hydrogenating atactic polystyrene, often referred to as polyvinylcyclohexane (PVCH).

6c. Hydrogenated aromatic polymers derived from hydrogenation of polymers mentioned under 6a.).

Homopolymers and copolymers may have any stereostructure including syndiotactic, isotactic, hemi-isotactic or atactic; where atactic polymers are preferred. Stereoblock polymers are also included.

7. Graft copolymers of vinyl aromatic monomers such as styrene or α-methylstyrene, for example styrene on polybutadiene, styrene on polybutadiene-styrene or polybutadiene-acrylonitrile copolymers; styrene and acrylonitrile (or methacrylonitrile) on polybutadiene; styrene, acrylonitrile and methyl methacrylate on polybutadiene; styrene and maleic anhydride on polybutadiene; styrene, acrylonitrile and maleic anhydride or maleimide on polybutadiene; styrene and maleimide on polybutadiene; styrene and alkyl acrylates or methacrylates on polybutadiene; styrene and acrylonitrile on ethylenepropylene/diene terpolymers; styrene and acrylonitrile on polyalkyl acrylates or polyalkyl methacrylates, styrene and acrylonitrile on acrylate/butadiene copolymers, as well as mixtures thereof with the copolymers listed under 6), for example the copolymer mixtures known as ABS, MBS, ASA or AES polymers.

8. Halogen-containing polymers such as polychloroprene, chlorinated rubbers, chlorinated and brominated copolymer of isobutylene-isoprene (halobutyl rubber), chlorinated or sulfo-chlorinated polyethylene, copolymers of ethylene and chlorinated ethylene, epichlorohydrin homo- and copolymers, especially polymers of halogen-containing vinyl compounds, for example polyvinyl chloride, polyvinylidene chloride, polyvinyl fluoride, polyvinylidene fluoride, as well as copolymers thereof such as vinyl chloride/vinylidene chloride, vinyl chloride/vinyl acetate or vinylidene chloride/vinyl acetate copolymers.

9. Polymers derived from α,β-unsaturated acids and derivatives thereof such as polyacrylates and polymethacrylates; polymethyl methacrylates, polyacrylamides and polyacrylonitriles, impact-modified with butyl acrylate.

10. Copolymers of the monomers mentioned under 9) with each other or with other unsaturated monomers, for example acrylonitrile/ butadiene copolymers, acrylonitrile/alkyl acrylate copolymers, acrylonitrile/alkoxyalkyl acrylate or acrylonitrile/vinyl halide copolymers or acrylonitrile/alkyl methacrylate/butadiene terpolymers.

11. Polymers derived from unsaturated alcohols and amines or the acyl derivatives or acetals thereof, for example polyvinyl alcohol, polyvinyl acetate, polyvinyl stearate, polyvinyl benzoate, polyvinyl maleate, polyvinyl butyral, polyallyl phthalate or polyallyl melamine; as well as their copolymers with olefins mentioned in 1) above.

12. Homopolymers and copolymers of cyclic ethers such as polyalkylene glycols, polyethylene oxide, polypropylene oxide or copolymers thereof with bisglycidyl ethers.

13. Polyacetals such as polyoxymethylene and those polyoxymethylenes which contain ethylene oxide as a comonomer; polyacetals modified with thermoplastic polyurethanes, acrylates or MBS.

14. Polyphenylene oxides and sulfides, and mixtures of polyphenylene oxides with styrene polymers or polyamides.

15. Polyurethanes derived from hydroxyl-terminated polyethers, polyesters or polybutadienes on the one hand and aliphatic or aromatic polyisocyanates on the other, as well as precursors thereof.
16. Polyamides and copolyamides derived from diamines and dicarboxylic acids and/or from aminocarboxylic acids or the corresponding lactams, for example polyamide 4, polyamide 6, polyamide 6/6, 6/10, 6/9, 6/12, 4/6, 12/12, polyamide 11, polyamide 12, aromatic polyamides starting from m-xylene diamine and adipic acid; polyamides prepared from hexamethylenediamine and isophthalic or/and terephthalic acid and with or without an elastomer as modifier, for example poly-2,4,4,-trimethylhexamethylene terephthalamide or poly-m-phenylene isophthalamide; and also block copolymers of the aforementioned polyamides with polyolefins, olefin copolymers, ionomers or chemically bonded or grafted elastomers; or with polyethers, e.g. with polyethylene glycol, polypropylene glycol or polytetramethylene glycol; as well as polyamides or copolyamides modified with EPDM or ABS; and polyamides condensed during processing (RIM polyamide systems).
17. Polyureas, polyimides, polyamide-imides, polyetherimids, polyesterimids, polyhydantoins and polybenzimidazoles.
18. Polyesters derived from dicarboxylic acids and diols and/ or from hydroxycarboxylic acids or the corresponding lactones, for example polyethylene terephthalate, polybutylene terephthalate, poly-1,4-dimethylolcyclohexane terephthalate, polyalkylene naphthalate (PAN) and polyhydroxybenzoates, as well as block copolyether esters derived from hydroxyl-terminated polyethers; and also polyesters modified with polycarbonates or MBS.
19. Polycarbonates and polyester carbonates.
20. Polyketones.
21. Polysulfones, polyether sulfones and polyether ketones.
22. Crosslinked polymers derived from aldehydes on the one hand and phenols, ureas and melamines on the other hand, such as phenol/formaldehyde resins, urea/formaldehyde resins and melamine/formaldehyde resins.
23. Drying and non-drying alkyd resins.
24. Unsaturated polyester resins derived from copolyesters of saturated and unsaturated dicarboxylic acids with polyhydric alcohols and vinyl compounds as crosslinking agents, and also halogen-containing modifications thereof of low flammability.
25. Crosslinkable acrylic resins derived from substituted acrylates, for example epoxy acrylates, urethane acrylates or polyester acrylates.
26. Alkyd resins, polyester resins and acrylate resins crosslinked with melamine resins, urea resins, isocyanates, isocyanurates, polyisocyanates or epoxy resins.
27. Crosslinked epoxy resins derived from aliphatic, cycloaliphatic, heterocyclic or aromatic glycidyl compounds, e.g. products of diglycidyl ethers of bisphenol A and bisphenol F, which are crosslinked with customary hardeners such as anhydrides or amines, with or without accelerators.
28. Blends of the aforementioned polymers (polyblends), for example PP/EPDM, Polyamide/EPDM or ABS, PVC/ EVA, PVC/ABS, PVC/MBS, PC/ABS, PBTP/ABS, PC/ASA, PC/PBT, PVC/CPE, PVC/acrylates, POM/thermoplastic PUR, PC/thermoplastic PUR, PON/acrylate, POM/MBS, PPO/HIPS, PPO/PA 6.6 and copolymers, PA/HDPE, PA/PP, PA/PPO, PBT/PC/ABS or PBT/PET/ PC.

The synthetic polymers to be protected are preferably thermoplastic polymers, especially polyolefins, polystyrenes, polyamides, polyesters, polyacrylates, most preferably polyolefins, in particular polyethylene and polypropylene or copolymers thereof with mono- and diolefins.

Preferred natural or synthetic phyllosilicates in nanoparticles are for example layered silicate clays in nanoparticles. Of special interest are nanocomposite materials comprising as component (b) a montmorillonite, bentonite, beidelite, mica, hectorite, saponite, nontronite, sauconite, vermiculite, ledikite, magadite, kenyaite, stevensite, volkonskoite or a mixture thereof in nanoparticles.

Preferably, component (b) is modified or intercalated by a modification agent such as, for example, an ammonium, an amine or a phosphonium compound.

Examples of modification agents for nano-clays are for example:
1. Amine and ammonium compounds, for example, distearyldimethylammonium chloride, stearylbenzyldimethylammonium chloride, stearylamine, stearyldiethoxyamine or aminododecanoic acid [commercially available as Nanofil (RTM) from Südchemie, Germany]; dimethyl ditallow ammonium, trioctylmethyl ammonium, dipolyoxyethylenealkylmethyl ammonium or polyoxypropylenemethyldiethyl ammonium [commercially available as modified Somasif (RTM) from CO-OP Chemical]; octadecylamine, triethoxysilanyl-propylamine [commercially available as Nanomer (RTM) from Nanocor], polyalkoxylated ammonium compounds such as for example octadecyl bis(polyoxyethylene[15]amine [Ethomeen (RTM) from Eastman] or octadecyl methyl bis(polyoxyethylene [15]ammonium chloride [Etoquad (RTM) from Eastman] or just the corresponding free amines.
2. Phosphonium compounds, for example tetrabutylphosphonium or octadecyl triphenyl phosphonium [commercially available from Eastman].
3. Others, for example, triethoxy octyl silane [commercially available as Nanomer (RTM) from Nanocor], ammonium, sulfonium or pyridium compounds as disclosed for example in WO-A-01/04050 or WO-A-99/67790; block graft copolymers such as for example PEO-b-PS or poly-4-vinylpyridine-b-PS; or solvents for swelling such as for example γ-butyrolactone, 2-pyrrolidone, dimethylsulfoxide, diglyme, tetrahydrofuran or furfuryl alcohol.

Nanocomposite materials which are of interest include those comprising as component (c) compounds of the formula I

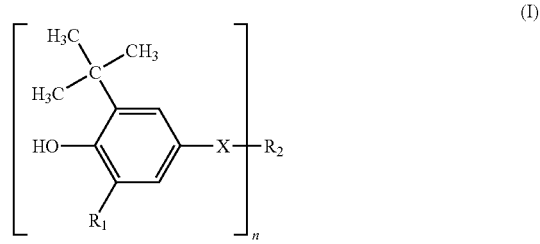

in which
$R_1$ is $C_1$-$C_4$alkyl,
n is 1, 2, 3 or 4,
X is methylene,

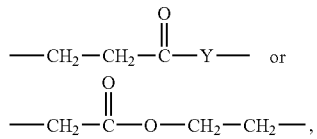

Y is hydrogen or —NH—; and,
if n is 1,
X is

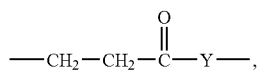

where Y is attached to $R_2$, and
$R_2$ is $C_1$-$C_{25}$alkyl; and,
if n is 2,
X is

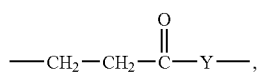

where Y is attached to $R_2$, and
$R_2$ is $C_2$-$C_{12}$alkylene, $C_4$-$C_{12}$alkylene interrupted by oxygen or sulfur; or, if Y is —NH—, $R_2$ is additionally a direct bond; and,
if n is 3,
X is methylene or

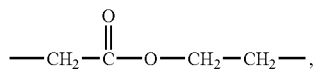

where the ethylene group is attached to
$R_2$, and
$R_2$ is

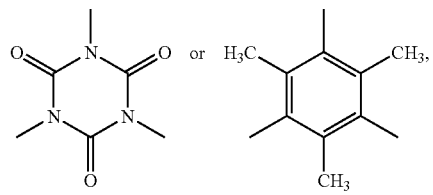

and
if n is 4,
X is

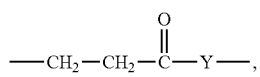

where Y is attached to $R_2$, and
$R_2$ is $C_4$-$C_{10}$alkanetetrayl.

Alkyl having up to 25 carbon atoms is a branched or unbranched radical, for example methyl, ethyl, propyl, iso-propyl, n-butyl, sec-butyl, isobutyl, tert-butyl, 2-ethylbutyl, n-pentyl, isopentyl, 1-methylpentyl, 1,3-dimethylbutyl, n-hexyl, 1-methylhexyl, n-heptyl, isoheptyl, 1,1,3,3-tetramethylbutyl, 1-methylheptyl, 3-methylheptyl, n-octyl, 2-ethylhexyl, 1,1,3,3-trimethylhexyl, 1,1,3,3-tetramethylpentyl, nonyl, decyl, undecyl, 1-methylundecyl, dodecyl, 1,1,3,3,5,5-hexamethylhexyl, tridecyl, tetradecyl, pentadecyl, hexadecyl, heptadecyl, octadecyl, eicosyl or docosyl. A preferred definition of $R_1$ is methyl and tert-butyl. A particularly preferred definition of $R_2$ is $C_1$-$C_{20}$alkyl, especially $C_1$-$C_{18}$alkyl, for example $C_{14}$-$C_{18}$alkyl. An especially preferred definition of $R_2$ is $C_8$-$C_{18}$alkyl, especially $C_{14}$-$C_{18}$alkyl, for example $C_{18}$alkyl.

$C_2$-$C_{12}$alkylene is a branched or unbranched radical, for example ethylene, propylene, tetramethylene, pentamethylene, hexamethylene, heptamethylene, octamethylene, decamethylene or dodecamethylene. A preferred definition of $R_2$ is, for example, $C_2$-$C_{10}$alkylene, especially $C_2$-$C_8$alkylene. An especially preferred definition of $R_2$ is, for example, $C_4$-$C_8$alkylene, especially $C_4$-$C_6$alkylene, for example hexamethylene.

$C_4$-$C_{12}$alkylene interrupted by oxygen or sulfur can be interrupted one or more times and is, for example, —CH$_2$—O—CH$_2$CH$_2$—O—CH$_2$—, —CH$_2$—(O—CH$_2$CH$_2$—)$_2$O—CH$_2$—, —CH$_2$—(O—CH$_2$CH$_2$—)$_3$O—CH$_2$—, —CH$_2$—(O—CH$_2$CH$_2$—)$_4$O—CH$_2$—, —CH$_2$CH$_2$—O—CH$_2$CH$_2$—O—CH$_2$CH$_2$— or —CH$_2$CH$_2$—S—CH$_2$CH$_2$—. A preferred definition of $R_2$ is, for example, $C_4$-$C_{10}$alkylene interrupted by oxygen or sulfur, especially $C_4$-$C_8$alkylene interrupted by oxygen or sulfur, for example $C_4$-$C_6$alkylene interrupted by oxygen or sulfur. An especially preferred meaning of $R_2$ is —CH$_2$CH$_2$—O—CH$_2$CH$_2$—O—CH$_2$CH$_2$— or —CH$_2$CH$_2$—S—CH$_2$CH$_2$—.

Alkanetetrayl having 4 to 10 carbon atoms is, for example,

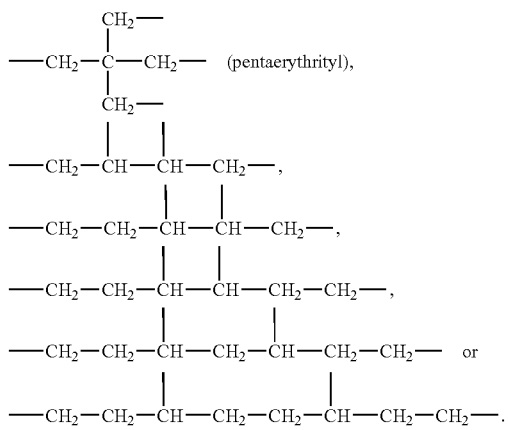

Pentaerythrityl is preferred.

Component (c) may also comprise mixtures of different sterically hindered phenols of the formula I.

Nanocomposite materials which are of interest include those comprising as component (c) at least one compound of the formula I in which, if n is 1, $R_2$ is $C_1$-$C_{20}$alkyl.

Preference is given to nanocomposite materials comprising as component (c) at least one compound of the formula I in which,
if n is 2,
$R_2$ is $C_2$-$C_8$alkylene, $C_4$-$C_8$alkylene interrupted by oxygen or sulfur; or, if Y is —NH—, $R_2$ is additionally a direct bond; and, if n is 3,
X is methylene,
R₂ is

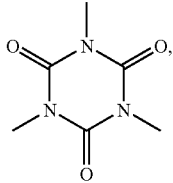

and,
if n is 4,
R₂ is $C_4$-$C_8$alkanetetrayl.

Preference is likewise given to nanocomposite materials comprising as component (c) at least one compound of the formula I in which
R₁ is methyl or tert-butyl,
n is 1, 2, 3 or 4,
X is methylene or

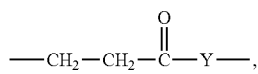

Y is hydrogen or —NH—; and,
if n is 1,
R₂ is $C_{14}$-$C_{18}$alkyl; and,
if n is 2,
R₂ is $C_4$-$C_6$alkylene, or is $C_4$-$C_6$alkylene interrupted by oxygen; and,
if n is 3,
X is methylene,
R₂ is,

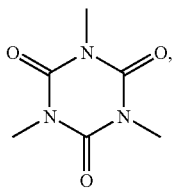

and,
if n is 4,
R₂ is $C_4$-$C_6$alkanetetrayl.

Likewise of interest are nanocomposite materials comprising as component (c) at least one compound of the formula I in which the compound of the formula I is a compound of the formula Ia to Ii

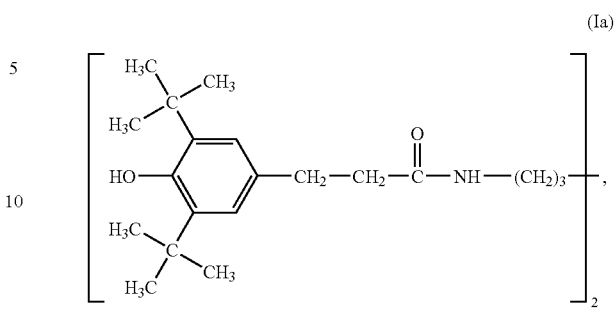

Irganox® 1098 (Ia)

Irganox® 1076 (Ib)

Irganox® 1010 (Ic)

Irganox® 245 (Id)

Irganox® 259 (Ie)

-continued (If)
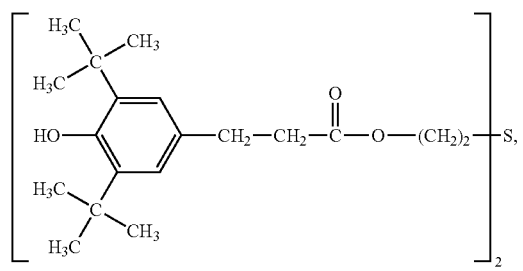
Irganox® 1035

(Ig)
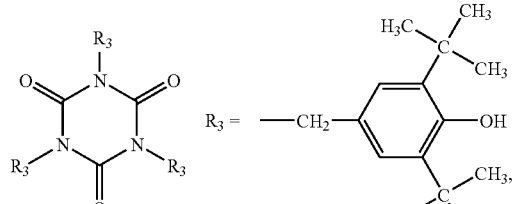
Irganox® 3114

(Ih)
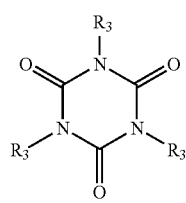

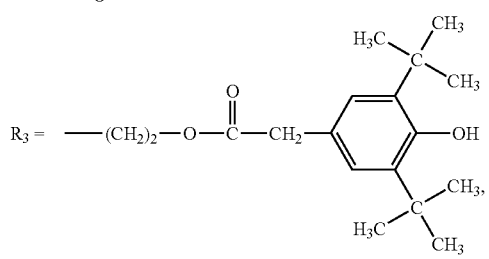
Irganox® 3125.

(Ii)
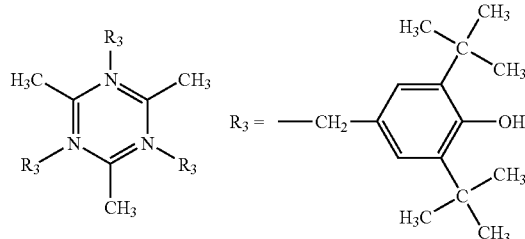
Irganox® 1330.

Irganox®1098, Irganox®1076, Irganox®1010, Irganox®245, Irganox®259, Irganox®3114, Irganox®1035, Irganox®3125 and Irganox®1330 are protected trade names of Ciba Specialty Chemicals Inc.

Preference is given to nanocomposite materials comprising as component (c) at least one compound of the formula I in which the compound of the formula I is a compound of the formula Ia, Ib, Ic or Id, in particular a compound of the formula Ia, Ib or Ic.

Component (c) of the novel nanocomposite materials, and the compounds of the formula I, are known and in some cases obtainable commercially. Possible preparation processes for the compounds of the formula I can be found, for example, in the U.S. Pat. Nos. 3,330,859 or 3,960,928.

Of interest are nanocomposite materials comprising as component (c) processing stabilizers selected from the group consisting of organic phosphites or phosphonites or benzofuran-2-ones.

Of particular interest are nanocomposite materials comprising as component (c) at least one compound from the group the benzofuran-2-one or of the group of the organic phosphites or phosphonites of the formulae II to VIII (II)
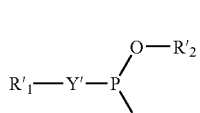

(III)
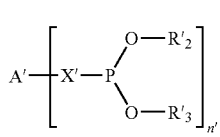

(VI)
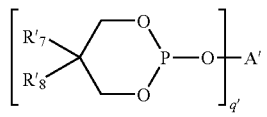

(VII)
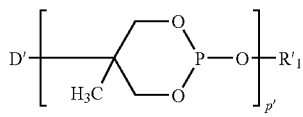

(IV)
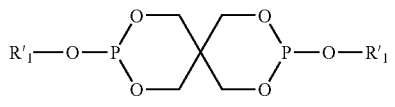

(V)
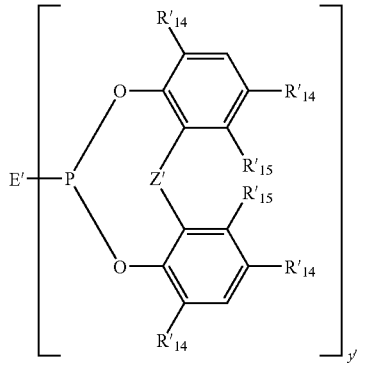

(VIII)
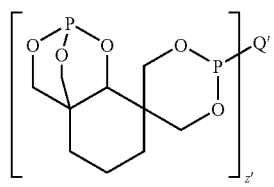

in which the indices are integral and n' is 2, 3 or 4; p' is 1 or 2; q' is 2 or 3; r' is 4 to 12; y' is 1, 2 or 3; and z' is 1 to 6;

A', if n' is 2, is $C_2$-$C_{18}$alkylene; $C_2$-$C_{12}$alkylene interrupted by oxygen, sulfur or —NR'$_4$—; a radical of the formula

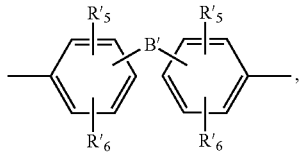

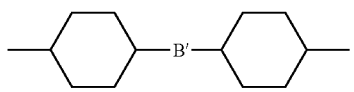

or phenylene;

A', if n' is 3, is a radical of the formula —$C_{r'}H_{2r'-1}$—;

A', if n' is 4, is

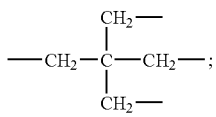

A'' has the meaning of A' if n' is 2;

B' is a direct bond, —$CH_2$—, —$CHR'_4$—, —$CR'_1R'_4$—, sulfur or $C_5$-$C_7$cycloalkylidene, or is cyclohexylidene substituted by from 1 to 4 $C_1$-$C_4$alkyl radicals in position 3, 4 and/or 5;

D', if p' is 1, is methyl and, if p' is 2, is —$CH_2OCH_2$—;

E', if y' is 1, is $C_1$-$C_{18}$alkyl, —OR'$_1$ or halogen;

E', if y is 2, is —O-A''-O—,

E', if y is 3, is a radical of the formula R'$_4$C($CH_2$O—)$_3$ or N($CH_2CH_2$O—)$_3$;

Q' is the radical of an at least z'-valent alcohol or phenol, this radical being attached via the oxygen atom to the phosphorus atom;

R'$_1$, R'$_2$ and R'$_3$ independently of one another are unsubstituted or halogen, —COOR$_4$', —CN— or —CONR$_4$'R$_4$'-substituted $C_1$-$C_{18}$alkyl; $C_2$-$C_{18}$alkyl interrupted by oxygen, sulfur or —NR'$_4$—; $C_7$-$C_9$phenylalkyl; $C_5$-$C_{12}$cycloalkyl, phenyl or naphthyl; naphthyl or phenyl substituted by halogen, 1 to 3 alkyl radicals or alkoxy radicals having in total 1 to 18 carbon atoms or by $C_7$-$C_9$phenylalkyl; or are a radical of the formula

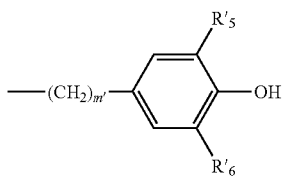

in which m' is an integer from the range 3 to 6;

R'$_4$ is hydrogen, $C_1$-$C_{18}$alkyl, $C_5$-$C_{12}$cycloalkyl or $C_7$-$C_9$phenylalkyl, R'$_5$ and R'$_6$ independently of one another are hydrogen, $C_1$-$C_8$alkyl or $C_5$-$C_6$cycloalkyl, R'$_7$ and R'$_8$, if q' is 2, independently of one another are $C_1$-$C_4$alkyl or together are a 2,3-dehydropentamethylene radical; and R'$_7$ and R'$_8$, if q' is 3, are methyl;

R'$_{14}$ is hydrogen, $C_1$-$C_9$alkyl or cyclohexyl,

R'$_{15}$ is hydrogen or methyl and, if two or more radicals R'$_{14}$ and R'$_{15}$ are present, these radicals are identical or different, X' and Y' are each a direct bond or oxygen, Z' is a direct bond, methylene, —C(R'$_{16}$)$_2$— or sulfur, and R'$_{16}$ is $C_1$-$C_8$alkyl.

Of particular interest are nanocomposite materials comprising as component (c) a benzofuran-2-one or a phosphite or phosphonite of the formula II, III, IV or V, in which n' is the number 2 and y' is the number 1, 2 or 3;

A' is $C_2$-$C_{18}$alkylene, p-phenylene or p-biphenylene,

E', if y' is 1, is $C_1$-$C_{18}$alkyl, —OR'$_1$ or fluorine;

E', if y' is 2, is p-biphenylene,

E', if y' is 3, is N($CH_2CH_2$O—)$_3$,

R'$_1$, R'$_2$ and R'$_3$ independently of one another are $C_1$-$C_{18}$alkyl, $C_7$-$C_9$phenylalkyl, cyclohexyl, phenyl, or phenyl substituted by 1 to 3 alkyl radicals having in total 1 to 18 carbon atoms;

R'$_{14}$ is hydrogen or $C_1$-$C_9$alkyl,

R'$_{15}$ is hydrogen or methyl;

X' is a direct bond,

Y' is oxygen,

Z' is a direct bond or —CH(R'$_{16}$)—, and

R'$_{16}$ is $C_1$-$C_4$alkyl.

Likewise of interest are nanocomposite materials comprising as component (c) a benzofuran-2-one or a phosphite or phosphonite of the formula II, III, IV or V, in which n' is the number 2 and y' is the number 1 or 3;

A' is p-biphenylene,

E', if y' is 1, is $C_1$-$C_{18}$alkoxy or fluorine,

E', if y' is 3, is N($CH_2CH_2$O—)$_3$,

R'$_1$, R'$_2$ and R'$_3$ independently of one another are $C_1$-$C_{18}$alkyl, or are phenyl substituted by 2 or 3 alkyl radicals having in total 2 to 12 carbon atoms;

R'$_{14}$ is methyl or tert-butyl;

R'$_{15}$ is hydrogen;

X' is a direct bond;

Y' is oxygen; and

Z' is a direct bond, methylene or —CH($CH_3$)—.

Particular preference is given to nanocomposite materials comprising as component (c) a phosphite or phosphonite of the formula II, III or V.

Special preference is given to nanocomposite materials comprising as component (c) at least one compound of the formula VII

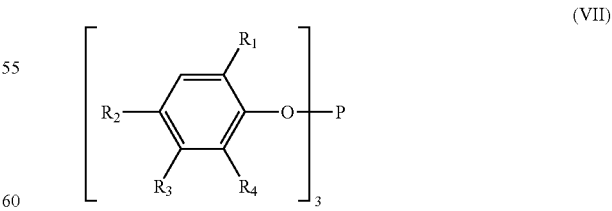

(VII)

in which $R_1$ and $R_2$ independently of one another are hydrogen, $C_1$-$C_8$alkyl, cyclohexyl or phenyl, and $R_3$ and $R_4$ independently of one another are hydrogen or $C_1$-$C_4$alkyl.

The following compounds are examples of organic phosphites and phosphonites which are particularly suitable as component (c) in the novel compositions.

Triphenyl phosphite, diphenyl alkyl phosphites, phenyl dialkyl phosphites, tris(nonylphenyl)phosphite, trilauryl phosphite, trioctadecyl phosphite, distearyl pentaerythritol diphosphite, tris(2,4-di-tert-butylphenyl)phosphite (Irgafos® 168, Ciba Specialty Chemicals Inc.), diisodecyl pentaerythritol diphosphite, bis(2,4-di-tert-butylphenyl)pentaerythritol diphosphite (formula D), bis(2,6-di-tert-butyl-4-methylphenyl)pentaerythritol diphosphite (formula E), bisisodecyloxy-pentaerythritol diphosphite, bis(2,4-di-tert-butyl-6-methylphenyl)pentaerythritol diphosphite, bis(2,4,6-tri-tert-butylphenyl)pentaerythritol diphosphite, tristearyl sorbitol triphosphite, tetrakis(2,4-di-tert-butylphenyl)4,4'-biphenylenediphosphonite (Irgafos®P-EPQ, Ciba Specialty Chemicals Inc., formula H), 6-isooctyloxy-2,4,8,10-tetra-tert-butyl-12H-dibenzo-[d,g]-1,3,2-dioxaphosphocin (formula C), 6-fluoro-2,4,8,10-tetra-tert-butyl-12-methyldibenzo-[d,g]-1,3,2-dioxaphosphocin (formula A), bis(2,4-di-tert-butyl-6-methylphenyl)methyl phosphite, bis(2,4-di-tert-butyl-6-methylphenyl)ethyl phosphite (formula G).

Particular preference is given to the use of the following phosphites and phosphonites:
tris(2,4-di-tert-butylphenyl)phosphite (Irgafos®168, Ciba Specialty Chemicals Inc.), tris(nonyl-phenyl)phosphite,

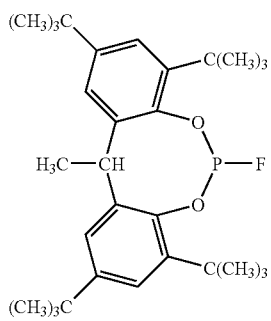
(A)

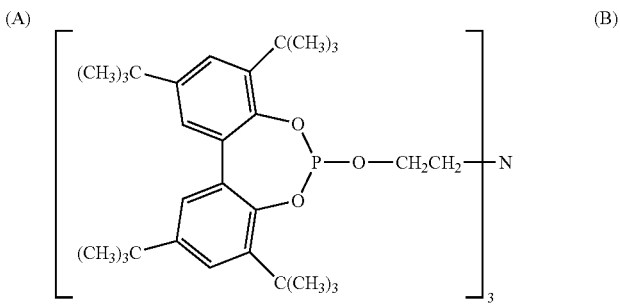
(B)

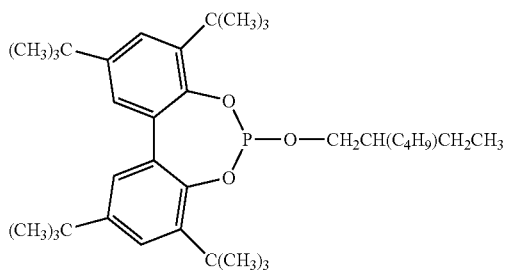
(C)

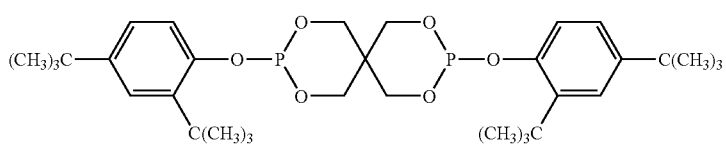
(D)

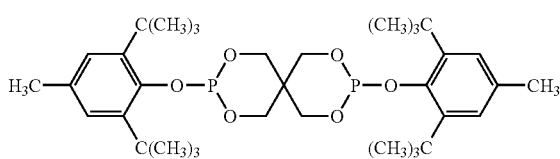
(E)

(F)

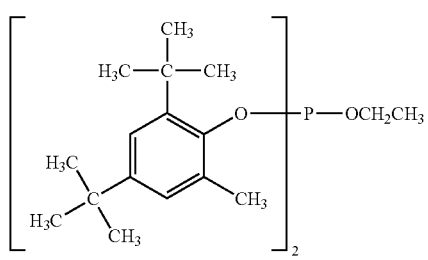
(G)

-continued

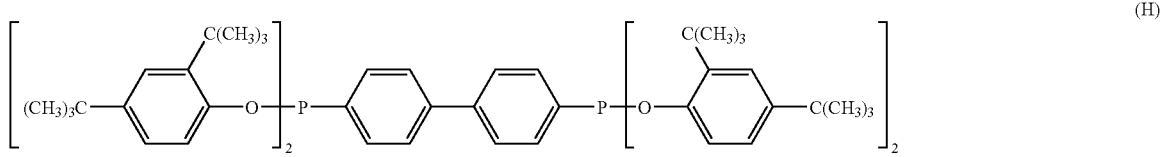

Very particular preference is given to tris(2,4-di-tert-butylphenyl)phosphite [Irgafos®168, Ciba Specialty Chemicals Inc.], bis(2,4-di-tert-butyl-6-methylphenyl)ethyl phosphite [Irgafos® 38, Ciba Specialty Chemicals Inc., formula (G)], bis(2,4-di-tert-butylphenyl)pentaerythritol diphosphite [Irgafos®126, Ciba Specialty Chemicals Inc., formula (D)] or tetrakis(2,4-di-tert-butylphenyl)-4,4'-biphenylenediphosphonite [Irgafos®P-EPQ, Ciba Specialty Chemicals Inc., formula (H)].

The above mentioned organic phosphites and phosphonites are known compounds; many of them are available commercially.

Preferred processing stabilizers from the class of benzofuran-2-ones are for example those disclosed in U.S. Pat. Nos. 4,325,863; 4,338,244; 5,175,312; 5,216,052; 5,252,643; DE-A-4316611; DE-A-4316622; DE-A-4316876; EP-A-0589839 or EP-A-0591102 or 3-[4-(2-acetoxyethoxy)phenyl]-5,7-di-tert-butylbenzofuran-2-one, 5,7-di-tert-butyl-3-[4-(2-stearoyloxyethoxy)phenyl]benzofuran-2-one, 3,3'-bis[5,7-di-tert-butyl-3-(4-[2-hydroxyethoxy]-phenyl)benzofuran-2-one], 5,7-di-tert-butyl-3-(4-ethoxyphenyl)benzofuran-2-one, 3-(4-acetoxy-3,5-dimethylphenyl)-5,7-di-tert-butylbenzofuran-2-one, 3-(3,5-dimethyl-4-pivaloyloxyphenyl)-5,7-di-tert-butylbenzofuran-2-one, 3-(3,4-dimethylphenyl)-5,7-di-tert-butylbenzofuran-2-one, 3-(2,3-dimethylphenyl)-5,7-di-tert-butylbenzofuran-2-one.

Of special interest are nanocomposite materials wherein component (c) is selected from the group consisting of
1. Tocopherols for example α-tocopherol, β-tocopherol, γ-tocopherol, δ-tocopherol and mixtures thereof (vitamin E),
2. Esters of β-(3,5-di-tert-butyl-4-hydroxyphenyl)progionic acid with mono- or polyhydric alcohols, e.g. with octadecanol, thiodiethylene glycol, pentaerythritol or tris(hydroxyethyl)isocyanurate,
3. Benzylphosphonates, for example dimethyl-2,5-di-tert-butyl-4-hydroxybenzylphosphonate, diethyl-3,5-di-tert-butyl-4-hydroxybenzylphosphonate, dioctadecyl-3,5-di-tert-butyl-4-hydroxybenzylphosphonate, dioctadecyl-5-tert-butyl-4-hydroxy-3-methylbenzylphosphonate or the calcium salt of the monoethyl ester of 3,5-di-tert-butyl-4-hydroxybenzylphosphonic acid,
4. Esters of β-(5-tert-butyl-4-hydroxy-3-methylphenyl)propionic acid with mono- or polyhydric alcohols, e.g. with diethylene glycol,
5. Amides of β-(3,5-di-tert-butyl-4-hydroxyphenyl)propionic acid e.g. N,N'-bis(3,5-di-tert-butyl-4-hydroxyphenylpropionyl)trimethylenediamide,
6. Phosphites and phosphonites, for example tris(2,4-di-tert-butylphenyl)phosphite, tetrakis-(2,4-di-tert-butylphenyl) 4,4'-biphenylene diphosphonite, and
7. Benzofuran-2-ones, for example 3-(3,4-dimethylphenyl)-5,7-di-tert-butylbenzofuran-2-one, 3-(2,3-dimethylphenyl)-5,7-di-tert-butylbenzofuran-2-one; or mixtures thereof.

Of very special interest are nanocomposite materials wherein component (c) is tris(2,4-di-tert-butylphenyl) phosphite, bis(2,4-di-tert-butyl-6-methylphenyl)ethyl phosphite, bis(2,4-di-tert-butylphenyl) pentaerythritol diphosphite, tetrakis(2,4-di-tert-butylphenyl)4,4'-biphenylenediphosphonite, 3-(3,4-dimethylphenyl)-5,7-di-tert-butylbenzofuran-2-one, 3-(2,3-dimethylphenyl)-5,7-di-tert-butylbenzofuran-2-one, and/or a compound of the formula Ia, Ib, Ic, Id or Ig

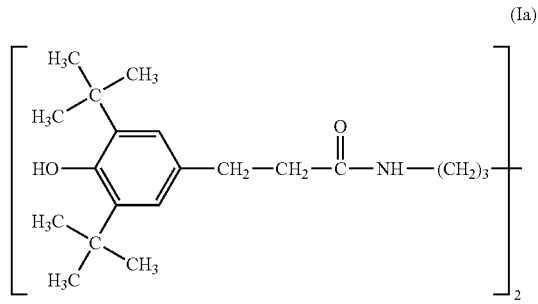

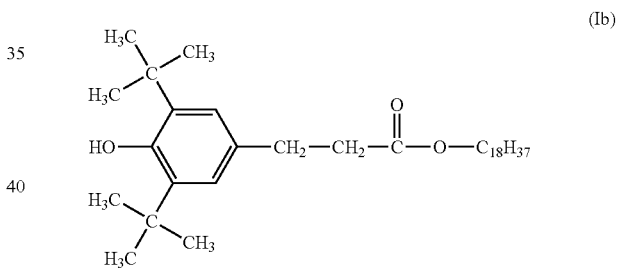

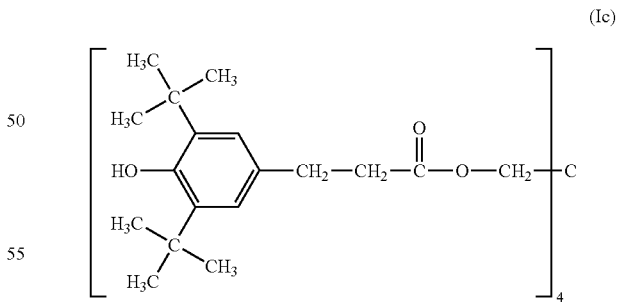

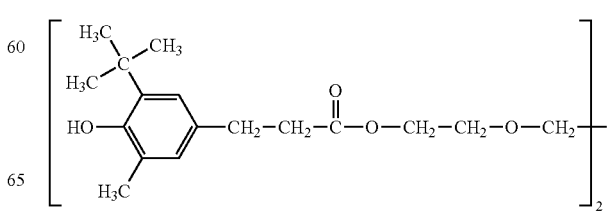

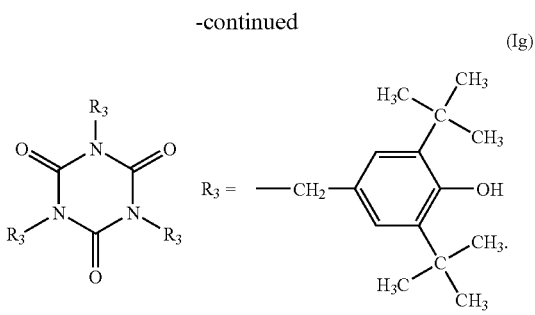

Of special interest is a nanocomposite material wherein component (d) is an epoxide.

For the purposes of this invention, epoxides [component (d)] can have an aliphatic, aromatic, cycloaliphatic, araliphatic or heterocyclic structure; they include epoxide groups as side groups, or these groups form part of an alicyclic or heterocyclic ring system. The epoxide groups are preferably attached as glycidyl groups to the remainder of the molecule by way of ether or ester linkages, or the compounds involved are N-glycidyl derivatives of heterocyclic amines, amides or imides. Epoxides of these types are generally known and commercially available.

Preferably, component (d) is a polyfunctional epoxide which comprises epoxide radicals, for example those of the formula E-1

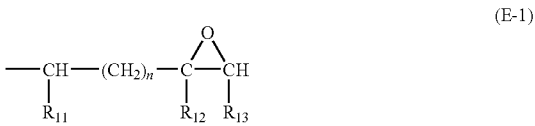

which are attached directly to carbon, oxygen, nitrogen or sulfur atoms, and wherein $R_{11}$ and $R_{13}$ are both hydrogen, $R_{12}$ is hydrogen or methyl and n is 0; or wherein $R_{11}$ and $R_{13}$ together are —CH$_2$CH$_2$— or —CH$_2$CH$_2$CH$_2$—, $R_{12}$ is then hydrogen, and n is 0 or 1.

Examples of epoxides are:

1. Diglycidyl and di(β-methylglycidyl)esters obtainable by reacting a compound with two carboxyl groups in the molecule and epichlorohydrin and/or glycerol dichlorohydrin and/or β-methylepichlorohydrin. The reaction is expediently carried out in the presence of bases.

As compounds of two carboxyl groups in the molecule, aliphatic dicarboxylic acids can be used. Examples of these dicarboxylic acids are glutaric acid, adipic acid, pimelic acid, suberic acid, azelic acid, sebacic acid or dimerized or trimerized linoleic acid.

It is however also possible to employ cycloaliphatic dicarboxylic acids such as, for example, tetrahydrophthalic acid, 4-methyltetrahydrophthalic acid, hexahydrophthalic acid or 4-methylhexahydrophthalic acid.

Furthermore, aromatic dicarboxylic acids, for example phthalic acid or isophthalic acid, can be used.

2. Diglycidyl, or di(β-methylglycidyl)ethers obtainable by reacting a compound with two free alcoholic hydroxyl groups and/or phenolic hydroxyl groups and a suitable substituted epichlorohydrin under alkaline conditions, or in the presence of an acidic catalyst with subsequent alkali treatment.

Ethers of this type are derived, for example, from acyclic alcohols, such as ethylene glycol, diethylene glycol and higher poly(oxyethylene)glycols, propane-1,2-diol, or poly (oxypropylene)glycols, propane-1,3-diol, butane-1,4-diol, poly(oxytetramethylene)glycols, pentane-1,5-diol, hexane-1,6-diol, sorbitol, and from polyepichlorohydrins.

However, they are also derived, for example, from cycloaliphatic alcohols such as 1,3- or 1,4-dihydroxycyclohexane, bis(4-hydroxycyclohexyl)methane, 2,2-bis(4-hydroxycyclohexyl)propane or 1,1-bis(hydroxymethyl)cyclohex-3-ene, or they possess aromatic nuclei, such as N,N-bis (2-hydroxyethyl)aniline or p,p'-bis(2-hydroxyethylamino) diphenylmethane.

The epoxides can also be derived from mononuclear phenols, such as, for example, from resorcinol, pyrocatechol or hydroquinone; or they are based on polynuclear phenols such as, for example, on 4,4'-dihydroxybiphenyl, bis(4-hydroxyphenyl)methane, 2,2-bis(4-hydroxyphenyl)propane, 2,2-bis (4-hydroxyphenyl)hexafluoropropane, 2,2-bis(3,5-dibromo-4-hydroxyphenyl)propane, 4,4'-dihydroxydiphenyl sulfone, 9,9'-bis(4-hydroxyphenyl)fluorene, or on condensation products of phenols with formaldehyde, obtained under acidic conditions, such as phenol novolaks.

3. Di(N-glycidyl) compounds are obtainable, for example, by dehydrochlorination of the reaction products of epichlorohydrin with amines containing two amino hydrogen atoms. Examples of these amines are aniline, toluidine, n-butylamine, bis(4-aminophenyl)methane, m-xylylenediamine or bis(4-methylaminophenyl)methane.

Also included among the di(N-glycidyl) compounds, however, are N,N'-diglycidyl derivatives of cycloalkyleneureas, such as ethyleneurea or 1,3-propyleneurea, and N,N'-diglycidyl derivatives of hydantoins, such as of 5,5-dimethylhydantoin.

4. Di(S-glycidyl) compounds, such as di-S-glycidyl derivatives derived from dithiols, such as, for example, ethane-1,2-dithiol or bis(4-mercaptomethylphenyl)ether.

5. Epoxides with a radical of the formula II in which $R_{11}$ and $R_{13}$ together are —CH$_2$CH$_2$— and n is 0 are, for example, bis(2,3-epoxycyclopentyl)ether, 2,3-epoxycyclopentyl glycidyl ether or 1,2-bis(2,3-epoxycyclopentyloxy) ethane; an example of epoxides with a radical of the formula II in which $R_{11}$ and $R_{13}$ together are —CH$_2$CH$_2$— and n is 1 is (3',4'-epoxy-6'-methylcyclohexyl)methyl 3,4-epoxy-6-methylcyclohexanecarboxylate.

Owing, for example, to their preparation process, the abovementioned difunctional epoxides may include small amounts of mono- or trifunctional fractions.

Predominantly, use is made of diglycidyl compounds having aromatic structures.

If desired, it is also possible to employ a mixture of epoxides of different structures.

Examples of suitable difunctional epoxides are:

a) liquid bisphenol A diglycidyl ethers, such as Araldite®GY 240, Araldite®GY 250, Araldite®GY 260, Araldite®GY 266, Araldite®GY 2600 or Araldite®MY 790;

b) solid bisphenol A diglycidyl ethers, such as Araldite®GT 6071, Araldite®GT 7071, Araldite®GT 7072, Araldite®GT 6063, Araldite®GT 7203, Araldite®GT 6064, Araldite®GT 7304, Araldite®GT 7004, Araldite®GT 6084, Araldite®GT 1999, Araldite®GT 7077, Araldite®GT 6097, Araldite®GT 7097, Araldite®GT 7008, Araldite®GT 6099, Araldite®GT 6608, Araldite®GT 6609 or Araldite®GT 6610;

c) liquid bisphenol F diglycidyl ethers, such as Araldite®GY 281, Araldite®GY 282, Araldite®PY 302 or Araldite®PY 306;

d) liquid glycidyl ethers of alcohols, such as Shell®Glycidylether 162, Araldite®DY 0390 or Araldite®DY 0391;

e) liquid glycidyl esters of carboxylic acids, such as Shell®Cardura E terephthalic ester, trimellitic ester, Araldite®PY 284 or mixtures of aromatic glycidyl esters, for example Araldite®PT 910;

f) liquid cycloaliphatic epoxy resins such as Araldite®CY 179.

Examples of suitable tri- and polyfunctional epoxides are:

a) solid polyglycidyl ethers of tetraphenylethane, such as CG Epoxy Resin®0163;

b) solid and liquid polyglycidyl ethers of phenol-formaldehyde novolak, such as EPN 1138, EPN 1139, GY 1180, PY 307;

c) solid and liquid polyglycidyl ethers of o-cresole-formaldehyde novolak, such as ECN 1235, ECN 1273, ECN 1280, ECN 1299;

d) solid heterocyclic epoxy resins (triglycidyl isocyanurate), such as Araldite®PT 810;

e) liquid N,N,O-triglycidyl ethers of p-aminophenol, such as Araldite®MY 0510;

f) tetraglycidyl-4,4'-methylenebenzamine or N,N,N',N'-tetraglycidyldiaminophenylmethane, such as Araldite®MY 720, Araldite®MY 721.

Particularly preferred difunctional epoxides are liquid or low-melting diglycidyl ethers based on bisphenols such as, for example, on 2,2-bis(4-hydroxyphenyl)propane (bisphenol A) or mixtures of bis(ortho/para-hydroxyphenyl)methane (bisphenol F).

Very particular preference is given to epoxides of the bisphenol A diglycidyl ether type, for example: Araldite®GT 6071, GT 7071, GT 7072, or epoxides of the bisphenol F type, such as Araldite®GY 281 or PY 306; diglycidyl 1,2-cyclohexanedicarboxylate, e.g. Araldite®PY 284; or phenol novolak epoxy resin, e.g. Araldite®PY EPN 1139.

Mono or polyfunctional, in particular trifunctional, compounds from the oxazoline class in the sense of this invention [component (d)] are known and are described, for example, in EP-A-0 583 807 and are, for example, compounds of the formula OX-1

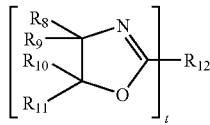

(OX-1)

in which $R_8$, $R_9$, $R_{10}$ and $R_{11}$, independently of one another, are hydrogen, halogen, $C_1$-$C_{20}$-alkyl, $C_4$-$C_{15}$cycloalkyl, unsubstituted or $C_1$-$C_4$alkyl-substituted phenyl, $C_1$-$C_{20}$alkoxy or $C_2$-$C_{20}$carboxyalkyl, if t=3, $R_{12}$ is trivalent linear, branched or cyclic aliphatic radical having 1 to 18 carbon atoms, which may be interrupted by oxygen or sulfur, or $R_{12}$ is furthermore an unsubstituted or $C_1$-$C_4$alkyl-substituted benzenetriyl radical, If t=2, $R_{12}$ is a divalent linear, branched or cyclic aliphatic radical having 1 to 18 carbon atoms, which may be interrupted by oxygen or sulfur, or $R_{12}$ is furthermore an unsubstituted or $C_1$-$C_4$alkyl-substituted phenylene radical, and If t=1, $R_{12}$ is a monovalent linear, branched or cyclic aliphatic radical having 1 to 18 carbon atoms, which may be interrupted by oxygen or sulfur, or $R_{12}$ is furthermore an unsubstituted or $C_1$-$C_4$alkyl-substituted phenyl radical.

Halogen is, for example, fluorine, chlorine, bromine or iodine, particularly preferably chlorine.

$C_1$-$C_{20}$alkyl is a branched or unbranched radical, for example methyl, ethyl, propyl, isopropyl, n-butyl, sec-butyl, iso-butyl, tert-butyl, 2-ethylbutyl, n-pentyl, iso-pentyl, 1-methylpentyl, 1,3-dimethylpentyl, n-hexyl, 1-methylhexyl, n-heptyl, iso-heptyl, 1,1,3,3-tetramethylbutyl, 1-methylheptyl, 3-methylheptyl, n-octyl, 2-ethylhexyl, 1,1,3-trimethylhexyl, 1,1,3,3-tetramethylpentyl, nonyl, decyl, undecyl, 1-methylundecyl, dodecyl, 1,1,3,3,5,5-hexamethylhexyl, tridecyl, tetradecyl, pentadecyl, hexadecyl, heptadecyl, octadecyl, eicosyl or docosyl. A preferred meaning of $R_8$, $R_9$, $R_{10}$ and $R_{11}$ is $C_1$-$C_{12}$alkyl, in particular $C_1$-$C_8$alkyl, for example $C_1$-$C_4$alkyl.

$C_4$-$C_{15}$cycloalkyl, in particular $C_5$-$C_{12}$cycloalkyl, is, for example, cyclobutyl, cyclopentyl, cyclohexyl, cycloheptyl, cyclooctyl or cyclododecyl. Preference is given to $C_5$-$C_8$cycloalkyl, in particular cyclohexyl.

$C_1$-$C_4$alkyl-substituted phenyl which preferably contains 1 to 3, in particular 1 or 2, alkyl groups is, for example, o-, m- or p-methylphenyl, 2,3-dimethylphenyl, 2,4-dimethylphenyl, 2,5-dimethylphenyl, 2,6-dimethylphenyl, 3,4-dimethylphenyl, 3,5-dimethylphenyl, 2-methyl-6-ethylphenyl, 4-tert-butylphenyl, 2-ethylphenyl or 2,6-diethylphenyl.

$C_1$-$C_{20}$alkoxy is a branched or unbranched radical, for example methoxy, ethoxy, propoxy, isopropoxy, n-butoxy, isobutoxy, pentoxy, isopentoxy, hexyloxy, heptyloxy, octyloxy, decyloxy, tetradecyloxy, hexadecyloxy or octadecyloxy. A preferred meaning of $R_8$, $R_9$, $R_{10}$ and $R_{11}$ is $C_1$-$C_{12}$alkoxy, in particular $C_1$-$C_8$alkoxy, for example $C_1$-$C_4$alkoxy.

$C_2$-$C_{20}$carboxyalkyl is a branched or unbranched radical, for example carboxymethyl, carboxyethyl, carboxypropyl, carboxybutyl, carboxypentyl, carboxyhexyl, carboxyheptyl, carboxyoctyl, carboxynonyl, carboxydecyl, carboxyundecyl, carboxydodecyl, 2-carboxy-1-propyl, 2-carboxy-1-butyl or 2-carboxy-1-pentyl. A preferred meaning of $R_8$, $R_9$, $R_{10}$ and $R_{11}$ is $C_2$-$C_{12}$-carboxyalkyl, in particular $C_2$-$C_8$carboxyalkyl, for example $C_2$-$C_4$carboxyalkyl.

A trivalent linear, branched or cyclic aliphatic radical having 1 to 18 carbon atoms, which may be interrupted by oxygen or sulfur, means that the three bonds may be on the same or on different atoms. Examples thereof are methanetriyl, 1,1,1-ethanetriyl, 1,1,1-propanetriyl, 1,1,1-butanetriyl, 1,1,1-pentanetriyl, 1,1,1-hexanetriyl, 1,1,1-heptanetriyl, 1,1,1-octanetriyl, 1,1,1-nonanetriyl, 1,1,1-decanetriyl, 1,1,1-undecanetriyl, 1,1,1-dodecanetriyl, 1,2,3-propanetriyl, 1,2,3-butanetriyl, 1,2,3-pentanetriyl, 1,2,3-hexanetriyl, 1,1,3-cyclopentanetriyl, 1,3,5-cyclohexanetriyl, 3-oxo-1,1,5-pentanetriyl or 3-thio-1,1,5-pentanetriyl.

A divalent linear, branched or cyclic aliphatic radical having 1 to 18 carbon atoms, which may be interrupted by oxygen or sulfur, means that the two bonds may be on the same or on different atoms. Examples thereof are methylene, ethylene, propylene, butylenes, pentylene, hexylene, heptylene, octylene, nonylene, decylene, undecylene or dodecylene.

Unsubstituted or $C_1$-$C_4$alkyl-substituted benzenetriyl, which preferably contains 1 to 3, in particular 1 or 2, alkyl groups, is, for example, 1,2,4-benzenetriyl, 1,3,5-benzenetriyl, 3-methyl-1,2,4-benzenetriyl or 2-methyl-1,3,5-benzenetriyl. Particular preference is given to 1,2,4-benzenetriyl and 1,3,5-benzenetriyl.

Of particular interest are compounds of the formula OX-1 in which

R$_8$, R$_9$, R$_{10}$ and R$_{11}$, independently of one another, are hydrogen or C$_1$-C$_4$alkyl, and R$_{12}$ is 1,2,4-benzenetriyl or 1,3,5-benzenetriyl.

Of special interest are compounds of the formula OX-1, for example 2,2',2"-(1,3,5-benzenetriyl)tris-2-oxazoline; 2,2',2"-(1,2,4-benzenetriyl)tris-4,4-dimethyl-2-oxazoline; 2,2',2"-(1,3,5-benzenetriyl)tris-4,4-dimethyl-2-oxazoline; 2,2',2"-(1,2,4-benzenetriyl)tris-5-methyl-2-oxazoline; or 2,2',2"-(1,3,5-benzenetriyl)tris-5-methyl-2-oxazoline.

Preferred difunctionl compounds from the bisoxazoline class in the sense of this invention have been described by T. Loontjens et al., Makromol. Chem., Macromol. Symp. 75, 211-216 (1993) and are, for example, compound of the formula OX-2, OX-3 and OX-4.

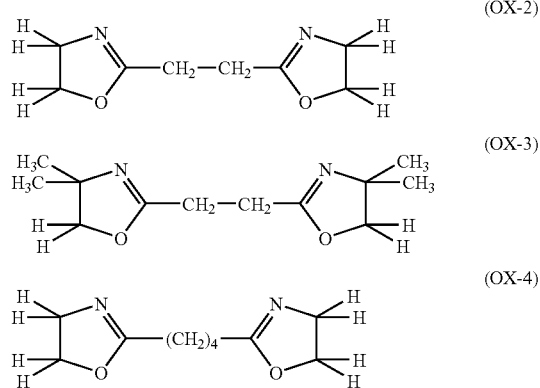

Mono or polyfunctional, in particular difunctional, compounds form the oxazine or oxazolone class in the sense of this invention [component (d)] are known and have been described, for example, by H. Inata et al., J. Applied Polymer Science Vol. 32 4581-4594 (1986) and are, for example, compounds of the formula OX-5 or OX-6

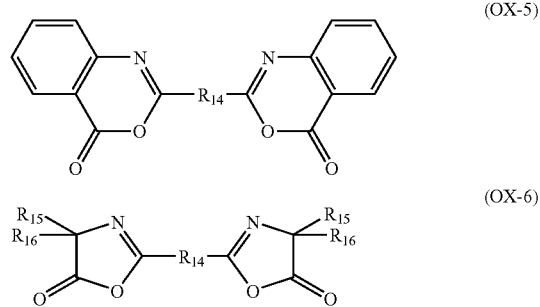

in which

R$_{14}$ is a direct bond or unsubstituted or C$_1$-C$_4$alkyl-substituted phenylene or thiophene, and R$_{15}$ and R$_{16}$, independently of one another, are hydrogen or C$_1$-C$_4$alkyl; or

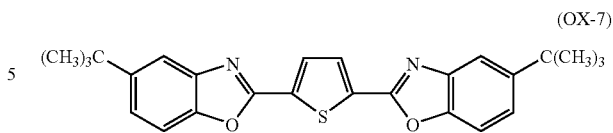

Special preference is given to compounds of the formula OX-5 and OX-6 in which R$_{14}$ is a direct bond, in particular 2,2'-bis(4H-3,1-benzoxazin-4-one) or OX-7.

Mono or polyfunctional, in particular difunctional, compounds form the isocyanate class in the sense of this invention [component (d)] are known and are, for example, compounds of the formula IC-1

$$O=C=N-R_{23}-N=C=O \qquad (IC-1)$$

in which R$_{23}$ is C$_1$-C$_{20}$alkylene or polymethylene, arylene, aralkylene or cycloalkylene.

Preferred diisocyanates are tetramethylene diisocyanate, hexamethylene diisocyanate, dodecamethylene diisocyanate, eicosane 1,20-diisocyanate, 4-butylhexamethylene diisocyanate, 2,2,4- and 2,4,4-trimethylhexamethylene diisocyanate, OCN(CH$_2$)$_2$O(CH$_2$)$_2$NCO, toluene 2,4-diisocyanate, p-phenylene diisocyanate, xylylene diisocyanate, 3-isocyanato-methyl-3,5,5-trimethylcyclohexyl isocyanate, naphthalene diisocyanates, sulfonyl diisocyanates, 3,3'-, 4,4'-and 3,4'-diisocyanatobiphenyl, 2,2-diphenylpropane and diphenyl ether, 3,3'-dimethyl-4,4'diisocyanates of diphenylmethane, 3,3'-dimethoxy-4,4'-diisocyanatobiphenyl and 4,4'-diisocyanatodiphenylmethane.

These diisocyanates are commercially available or can be prepared from commercially available amines.

However, it is also possible to employ diisocyanate generators, such as polymeric urethanes, uretdione dimers and higher oligomers, cyanurate polymers, urethanes and polymeric urethanes of cyanurate polymers and thermally dissociable adducts of Schiff's bases.

Mono or polyfunctional, in particular difunctional, compounds form the anhydride class in the sense of this invention [component (d)] are known and are, for example, compounds of the formula AH-1

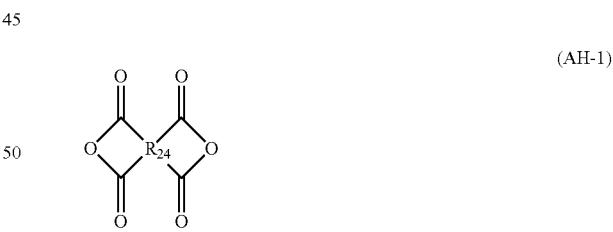

in which R$_{24}$ is a radical of the formula AH-1a to AH-1j

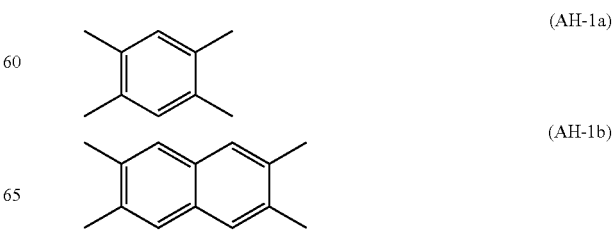

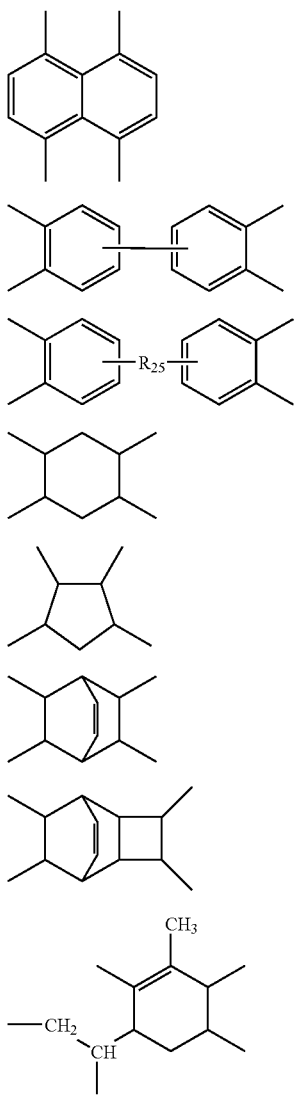

in which R$_{25}$ is —CH$_2$—, —CH(CH$_3$)—, —C(CH$_3$)$_2$—, C(CF$_3$)$_2$—, —S—, —O—, —(O)S(O)—, —NHCO—, —CO— or —P(O)(C$_1$-C$_{20}$alkyl)- and in which the aromatic rings in the formula AH-1a to AH-1e are unsubstituted or substituted by one or more C$_1$-C$_6$alkyl groups, C$_1$-C$_6$alkoxy groups or halogen atoms.

An example of a trifunctional anhydride is mellitic anhydride.

Preference is given to tetracarboxylic dianhydrides containing aromatic rings. These tetracarboxylic anhydrides are commercially available. It is also possible to employ a mixture of tetracarboxylic dianhydrides having different structures.

Preferably, the natural or synthetic phyllosilicate or a mixture of such phyllosilicates in nanoparticles [component (b)] is present in the nanocomposite material in an amount of from 0.01 to 30%, in particular 0.1 to 20%, for example from 0.5 to 10%, based on the weight of the synthetic polymer [component (a)].

The phenolic antioxidant and/or processing stabilizer [component (c)] is preferably added to the nanocomposite material in an amount of from 0.01 to 5%, in particular 0.05 to 5%, for example from 0.1 to 2%, based on the weight of the synthetic polymer [component (a)].

The mono or polyfunctional compound selected from the class consisting of the epoxides, oxazolines, oxazolones, oxazines, isocyanates and/or anhydrides [component (d)] is preferably added to the nanocomposite material in an amount of from 0.01 to 5%, in particular 0.1 to 5%, for example from 0.1 to 2%, based on the weight of the synthetic polymer [component (a)].

In addition to components (a), (b), (c) and (d) the novel nanocomposite materials may comprise further additives, such as, for example, the following:

1. Antioxidants 1.1. Alkylated monophenols, for example 2,6-di-tert-butyl-4-methylphenol, 2-tert-butyl-4,6-dimethylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-(α-methylcyclohexyl)-4,6-dimethylphenol, 2,6-dioctadecyl-4-methylphenol, 2,4,6-tricyclohexylphenol, 2,6-di-tert-butyl-4-methoxymethylphenol, nonylphenols which are linear or branched in the side chains, for example 2,6-di-nonyl-4-methylphenol, 2,4-dimethyl-6-(1'-methylundec-1'-yl)phenol, 2,4-dimethyl-6-(1'-methylheptadec-1'-yl)phenol, 2,4-dimethyl-6-(1'-methyltridec-1'-yl)phenol and mixtures thereof.

1.2. Alkylthiomethylphenols, for example 2,4-dioctylthiomethyl-6-tert-butylphenol, 2,4-dioctylthiomethyl-6-methylphenol, 2,4-dioctylthiomethyl-6-ethylphenol, 2,6-di-dodecylthiomethyl-4-nonylphenol.

1.3. Hydroquinones and alkylated hydroquinones, for example 2,6-di-tert-butyl-4-methoxyphenol, 2,5-di-tert-butylhydroquinone, 2,5-di-tert-amylhydroquinone, 2,6-diphenyl-4-octadecyloxyphenol, 2,6-di-tert-butylhydroquinone, 2,5-di-tert-butyl-4-hydroxyanisole, 3,5-di-tert-butyl-4-hydroxyanisole, 3,5-di-tert-butyl-4-hydroxyphenyl stearate, bis(3,5-di-tert-butyl-4-hydroxyphenyl)adipate.

1.4. Tocopherols, for example α-tocopherol, β-tocopherol, γ-tocopherol, δ-tocopherol and mixtures thereof (vitamin E).

1.5. Hydroxylated thiodiphenyl ethers, for example 2,2'-thiobis(6-tert-butyl-4-methylphenol), 2,2'-thiobis(4-octylphenol), 4,4'-thiobis(6-tert-butyl-3-methylphenol), 4,4'-thiobis(6-tert-butyl-2-methylphenol), 4,4'-thiobis(3,6-di-sec-amylphenol), 4,4'-bis(2,6-dimethyl-4-hydroxyphenyl) disulfide.

1.6. Alkylidenebisphenols, for example 2,2'-methylenebis(6-tert-butyl-4-methylphenol), 2,2'-methylenebis(6-tert-butyl-4-ethylphenol), 2,2'-methylenebis[4-methyl-6-(α-methylcyclohexyl)phenol], 2,2'-methylenebis(4-methyl-6-cyclohexylphenol), 2,2'-methylenebis(6-nonyl-4-methylphenol), 2,2'-methylenebis(4,6-di-tert-butylphenol), 2,2'-ethylidenebis(4,6-di-tert-butylphenol), 2,2'-ethylidenebis(6-tert-butyl-4-isobutylphenol), 2,2'-methylenebis[6-(α-methylbenzyl)-4-nonylphenol], 2,2'-methylenebis[6-(α,α-dimethylbenzyl)-4-nonylphenol], 4,4'-methylenebis(2,6-di-tert-butylphenol), 4,4'-methylenebis(6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methylphenyl)-3-n-dodecylmercaptobutane, ethylene glycol bis[3,3-bis(3'-tert-butyl-4'-hydroxyphenyl)butyrate], bis(3-tert-butyl-4-hydroxy-5-methyl-phenyl)dicyclopentadiene, bis[2-(3'- tert-butyl-2'-hydroxy-5'-methylbenzyl)-6-tert-butyl-4-methylphenyl]terephthalate, 1,1-bis-(3,5-dimethyl-2-hydroxyphenyl)butane, 2,2-bis(3,5-di-tert-butyl-4-hydroxyphenyl)propane, 2,2-bis-(5-tert-butyl-4-hydroxy2-methylphenyl)-4-n-dodecylmercaptobutane, 1,1,5,5-tetra(5-tert-butyl-4-hydroxy-2-methylphenyl)pentane.

1.7. O—, N— and S-benzyl compounds, for example 3,5,3',5'-tetra-tert-butyl-4,4'-dihydroxydibenzyl ether, octadecyl-4-hydroxy-3,5-dimethylbenzylmercaptoacetate, tridecyl-4-hydroxy-3,5-di-tert-butylbenzylmercaptoacetate, tris(3,5-di-tert-butyl-4-hydroxybenzyl)amine, bis(4-tert-butyl-3-hydroxy-2,6-dimethylbenzyl)dithioterephthalate, bis(3,5-di-tert-butyl-4-hydroxybenzyl)sulfide, isooctyl-3,5-di-tert-butyl-4-hydroxybenzylmercaptoacetate.

1.8. Hydroxybenzylated malonates, for example dioctadecyl-2,2-bis(3,5-di-tert-butyl-2-hydroxybenzyl)malonate, di-octadecyl-2-(3-tert-butyl-4-hydroxy-5-methylbenzyl) malonate, di-dodecylmercaptoethyl-2,2-bis(3,5-di-tert-butyl-4-hydroxybenzyl)malonate, bis[4-(1,1,3,3-tetramethylbutyl)phenyl]-2,2-bis(3,5-di-tert-butyl-4-hydroxybenzyl)malonate.

1.9. Aromatic hydroxybenzyl compounds, for example 1,3,5-tris(3,5-di-tert-butyl-4-hydroxybenzyl)-2,4,6-trimethylbenzene, 1,4-bis(3,5-di-tert-butyl-4-hydroxybenzyl)-2,3,5,6-tetramethylbenzene, 2,4,6-tris(3,5-di-tert-butyl-4-hydroxybenzyl)phenol.

1.10. Triazine compounds, for example 2,4-bis(octylmercapto)-6-(3,5-di-tert-butyl-4-hydroxyanilino)-1,3,5-triazine, 2-octylmercapto-4,6-bis(3,5-di-tert-butyl-4-hydroxyanilino)-1,3,5-triazine, 2-octylmercapto-4,6-bis(3,5-di-tert-butyl-4-hydroxyphenoxy)-1,3,5-triazine, 2,4,6-tris-(3,5-di-tert-butyl-4-hydroxyphenoxy)-1,2,3-triazine, 1,3,5-tris(3,5-di-tert-butyl-4-hydroxybenzyl)isocyanurate, 1,3,5-tris(4-tert-butyl-3-hydroxy-2,6-dimethylbenzyl)isocyanurate, 2,4,6-tris-(3,5-di-tert-butyl-4-hydroxyphenylethyl)-1,3,5-triazine, 1,3,5-tris(3,5-di-tert-butyl-4-hydroxyphenylpropionyl) hexahydro-1,3,5-triazine, 1,3,5-tris(3,5-dicyclohexyl-4-hydroxybenzyl)isocyanurate.

1.11. Benzylphosphonates, for example dimethyl-2,5-di-tert-butyl-4-hydroxybenzylphosphonate, diethyl-3,5-di-tert-butyl-4-hydroxybenzylphosphonate, dioctadecyl3,5-di-tert-butyl-4-hydroxybenzylphosphonate, dioctadecyl-5-tert-butyl-4-hydroxy-3-methylbenzylphosphonate, the calcium salt of the monoethyl ester of 3,5-di-tert-butyl-4-hydroxybenzylphosphonic acid.

1.12. Acylaminophenols, for example 4-hydroxylauranilide, 4-hydroxystearanilide, octyl N-(3,5-di-tert-butyl-4-hydroxyphenyl)carbamate.

1.13. Esters of β-(3,5-di-tert-butyl-4-hydroxyphenyl)propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.14. Esters of β-(5-tert-butyl-4-hydroxy-3-methylphenyl) propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl) oxamide, 3-thiaundecanol, 3-thiapentadecanol, trimethylhexanediol, trimethylolpropane, 4-hydroxymethyl-1-phospha-2,6,7-trioxabicyclo[2.2.2]octane; 3,9-bis[2-{3-(3-tert-butyl-4-hydroxy-5-methylphenyl)propionyloxy}-1,1-dimethylethyl]-2,4,8,10-tetraoxaspiro[5.5]-undecane.

1.15. Esters of β-(3,5-dicyclohexyl-4-hydroxyphenyl)propionic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.16. Esters of 3,5-di-tert-butyl-4-hydroxyphenyl acetic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.17. Amides of β-(3,5-di-tert-butyl-4-hydroxyphenyl)propionic acid e.g. N,N'-bis(3,5-di-tert-butyl-4-hydroxyphenylpropionyl)hexamethylenediamide, N,N'-bis(3,5-di-tert-butyl-4-hydroxyphenylpropionyl)trimethylenediamide, N,N'-bis(3,5-di-tert-butyl-4-hydroxyphenylpropionyl)hydrazide, N,N'-bis[2-(3-[3,5-di-tert-butyl-4-hydroxyphenyl]propionyloxy)ethyl]oxamide (Naugard®XL-1, supplied by Uniroyal).

1.18. Ascorbic acid (vitamin C)

1.19. Aminic antioxidants, for example N,N'-di-isopropyl-p-phenylenediamine, N,N'-di-sec-butyl-p-phenylenediamine, N,N'-bis(1,4-dimethylpentyl)-p-phenylenediamine, N,N'-bis(1-ethyl-3-methylpentyl)-p-phenylenediamine, N,N'-bis(1-methylheptyl)-p-phenylenediamine, N,N'-dicyclohexyl-p-phenylenediamine, N,N'-diphenyl-p-phenylenediamine, N,N'-bis(2-naphthyl)-p-phenylenediamine, N-isopropyl-N'-phenyl-p-phenylenediamine, N-(1,3-dimethylbutyl)-N'-phenyl-p-phenylenediamine, N-(1-methylheptyl)-N'-phenyl-p-phenylenediamine, N-cyclohexyl-N'-phenyl-p-phenylenediamine, 4-(p-toluenesulfamoyl) diphenylamine, N,N'-dimethyl-N,N'-di-sec-butyl-p-phenylenediamine, diphenylamine, N-allyldiphenylamine, 4-isopropoxydiphenylamine, N-phenyl-1-naphthylamine, N-(4-tert-octylphenyl)-1-naphthylamine, N-phenyl-2-naphthylamine, octylated diphenylamine, for example p,p'-di-tert-octyldiphenylamine, 4-n-butylaminophenol, 4-butyrylaminophenol, 4-nonanoylaminophenol, 4-dodecanoylaminophenol, 4-octadecanoylaminophenol, bis(4-methoxyphenyl) amine, 2,6-di-tert-butyl-4-dimethylaminomethylphenol, 2,4'-diaminodiphenylmethane, 4,4'-diaminodiphenylmethane, N,N,N',N'-tetramethyl-4,4'-diaminodiphenylmethane, 1,2-bis[(2-methylphenyl)amino]ethane, 1,2-bis (phenylamino)propane, (o-tolyl)biguanide, bis[4-(1',3'-dimethylbutyl)phenyl]amine, tert-octylated N-phenyl-1-naphthylamine, a mixture of mono- and dialkylated tert-butyl/tert-octyldiphenylamines, a mixture of mono- and dialkylated nonyldiphenylamines, a mixture of mono- and dialkylated dodecyldiphenylamines, a mixture of mono- and dialkylated isopropyl/isohexyldiphenylamines, a mixture of mono- and dialkylated tert-butyldiphenylamines, 2,3-dihydro-3,3-dimethyl-4H-1,4-benzothiazine, phenothiazine, a mixture of mono- and dialkylated tert-butyl/tert-octylphenothiazines, a mixture of mono- and dialkylated tert-octylphenothiazines, N-allylphenothiazine, N,N,N',N'-tetraphenyl-1,4-diaminobut-2-ene.

2. UV absorbers and light stabilizers 2.1. 2-(2'-Hydroxyphenyl)benzotriazoles, for example 2-(2'-hydroxy-5'-methylphenyl)benzotriazole, 2-(3',5'-di-tert-butyl-2'-hydroxyphenyl)benzotriazole, 2-(5'-tert-butyl-2'-hydroxyphenyl) benzotriazole, 2-(2'-hydroxy-5'-(1,1,3,3-tetramethylbutyl)phenyl)benzotriazole, 2-(3',5'-di-tert-butyl-2'-hydroxyphenyl)-5-chlorobenzotriazole, 2-(3'-tert-butyl-2'-hydroxy-5'-methylphenyl)-5-chlorobenzotriazole, 2-(3'-sec-butyl-5'-tert-butyl-2'-hydroxyphenyl)benzotriazole, 2-(2'-hydroxy-4'-octyloxyphenyl)benzotriazole, 2-(3',5'-di-tert-amyl-2'-hydroxyphenyl)benzotriazole, 2-(3',5'-bis(α,α-dimethylbenzyl)-2'-hydroxyphenyl)benzotriazole, 2-(3'-tert-butyl-2'-hydroxy-5'-(2-octyloxycarbonylethyl)phenyl)-5-chlorobenzotriazole, 2-(3'-tert-butyl-5'-[2-(2-ethylhexyloxy)carbonylethyl]-2'-hydroxyphenyl)-5-chlorobenzotriazole, 2-(3'-tert-butyl-2'-hydroxy-5'-(2-methoxycarbonylethyl)phenyl)-5-chlorobenzotriazole, 2-(3'-tert-butyl-2'-hydroxy-5'-(2-methoxycarbonylethyl)phenyl)benzotriazole, 2-(3'-tert-butyl-2'-hydroxy-5'-(2-octyloxycarbonylethyl)phenyl)benzotriazole, 2-(3'-tert-butyl-5'-[2-(2-ethylhexyloxy)carbonylethyl]-2'-hydroxyphenyl)benzotriazole, 2-(3'-dodecyl-2'-hydroxy-5'-methylphenyl)benzotriazole, 2-(3'-tert-butyl-2'-hydroxy-5'-(2-isooctyloxycarbonylethyl) phenylbenzotriazole, 2,2'-methylenebis[4-(1,1,3,3-tetramethylbutyl)-6-benzotriazole-2-ylphenol]; the transesterification product of 2-[3'-tert-butyl-5'-(2-methoxycarbonylethyl)-2'-hydroxyphenyl]-2H-benzotriazole with polyethylene glycol 300; [R—CH$_2$CH$_2$—COO—CH$_2$CH$_2$—]$_2$, where R=3'-tert-butyl-4'-hydroxy-5'-2H-benzotriazol-2-ylphenyl, 2-[2'-hydroxy-3'-(α,α-dimethylbenzyl)-5'-(1,1,3,3-tetramethylbutyl)phenyl]-benzotriazole; 2-[2'-hydroxy-3'-(1,1,3,3-tetramethylbutyl)-5'-(α,α-dimethylbenzyl)phenyl]benzotriazole.

2.2. 2-Hydroxybenzophenones, for example the 4-hydroxy, 4-methoxy, 4-octyloxy, 4-decyloxy, 4-dodecyloxy, 4-benzyloxy, 4,2',4'-trihydroxy and 2'-hydroxy-4,4'-dimethoxy derivatives.

2.3. Esters of substituted and unsubstituted benzoic acids, for example 4-tert-butylphenyl salicylate, phenyl salicylate, octylphenyl salicylate, dibenzoyl resorcinol, bis(4-tert-butylbenzoyl)resorcinol, benzoyl resorcinol, 2,4-di-tert-butylphenyl 3,5-di-tert-butyl-4-hydroxybenzoate, hexadecyl 3,5-di-tert-butyl-4-hydroxybenzoate, octadecyl 3,5-di-tert-butyl-4-hydroxybenzoate, 2-methyl-4,6-di-tert-butylphenyl 3,5-di-tert-butyl-4-hydroxybenzoate.

2.4. Acrylates, for example ethyl α-cyano-β,β-diphenylacrylate, isooctyl α-cyano-β,β-diphenylacrylate, methyl α-carbomethoxycinnamate, methyl α-cyano-β-methyl-p-methoxycinnamate, butyl α-cyano-β-methyl-p-methoxycinnamate, methyl α-carbomethoxy-p-methoxycinnamate and N-(β-carbomethoxy-β-cyanovinyl)-2-methylindoline.

2.5. Nickel compounds, for example nickel complexes of 2,2'-thiobis[4-(1,1,3,3-tetramethylbutyl)phenol], such as the 1:1 or 1:2 complex, with or without additional ligands such as n-butylamine, triethanolamine or N-cyclohexyldiethanolamine, nickel dibutyldithiocarbamate, nickel salts of the monoalkyl esters, e.g. the methyl or ethyl ester, of 4-hydroxy-3,5-di-tert-butylbenzylphosphonic acid, nickel complexes of ketoximes, e.g. of 2-hydroxy-4-methylphenylundecylketoxime, nickel complexes of 1-phenyl-4-lauroyl-5-hydroxypyrazole, with or without additional ligands.

2.6. Sterically hindered amines, for example bis(2,2,6,6-tetramethyl-4-piperidyl)sebacate, bis(2,2,6,6-tetramethyl-4-piperidyl)succinate, bis(1,2,2,6,6-pentamethyl-4-piperidyl)sebacate, bis(1-octyloxy-2,2,6,6-tetramethyl-4-piperidyl)sebacate, bis(1,2,2,6,6-pentamethyl-4-piperidyl)n-butyl-3,5-di-tert-butyl-4-hydroxybenzylmalonate, the condensate of 1-(2-hydroxyethyl)-2,2,6,6-tetramethyl-4-hydroxypiperidine and succinic acid, linear or cyclic condensates of N,N'-bis(2,2,6,6-tetramethyl-4-piperidyl)hexamethylenediamine and 4-tert-octylamino-2,6-dichloro-1,3,5-triazine, tris(2,2,6,6-tetramethyl-4-piperidyl)nitrilotriacetate, tetrakis(2,2,6,6-tetramethyl-4-piperidyl)-1,2,3,4-butanetetracarboxylate, 1,1'-(1,2-ethanediyl)-bis(3,3,5,5-tetramethylpiperazinone), 4-benzoyl-2,2,6,6-tetramethylpiperidine, 4-stearyloxy-2,2,6,6-tetramethylpiperidine, bis(1,2,2,6,6-pentamethylpiperidyl)-2-n-butyl-2-(2-hydroxy-3,5-di-tert-butylbenzyl)malonate, 3-n-octyl-7,7,9,9-tetramethyl-1,3,8-triazaspiro[4.5]decane-2,4-dione, bis(1-octyloxy-2,2,6,6-tetramethylpiperidyl)sebacate, bis(1-octyloxy-2,2,6,6-tetramethylpiperidyl)succinate, linear or cyclic condensates of N,N'-bis(2,2,6,6-tetramethyl-4-piperidyl)hexamethylenediamine and 4-morpholino-2,6-dichloro-1,3,5-triazine, the condensate of 2-chloro-4,6-bis(4-n-butylamino-2,2,6,6-tetramethylpiperidyl)-1,3,5-triazine and 1,2-bis(3-aminopropylamino)ethane, the condensate of 2-chloro-4,6-di-(4-n-butylamino-1,2,2,6,6-pentamethylpiperidyl)-1,3,5-triazine and 1,2-bis(3-aminopropylamino)ethane, 8-acetyl-3-dodecyl-7,7,9,9-tetramethyl-1,3,8-triazaspiro[4.5]decane-2,4-dione, 3-dodecyl-1-(2,2,6,6-tetramethyl-4-piperidyl)pyrrolidine-2,5-dione, 3-dodecyl-1-(1,2,2,6,6-pentamethyl-4-piperidyl)pyrrolidine-2,5-dione, a mixture of 4-hexadecyloxy- and 4-stearyloxy-2,2,6,6-tetramethylpiperidine, a condensate of N,N'-bis(2,2,6,6-tetramethyl-4-piperidyl)hexamethylenediamine and 4-cyclohexylamino-2,6-dichloro-1,3,5-triazine, a condensate of 1,2-bis(3-aminopropylamino)ethane and 2,4,6-trichloro-1,3,5-triazine as well as 4-butylamino-2,2,6,6-tetramethylpiperidine (CAS Reg. No. [136504-96-6]); a condensate of 1,6-hexanediamine and 2,4,6-trichloro-1,3,5-triazine as well as N,N-dibutylamine and 4-butylamino-2,2,6,6-tetramethylpiperidine (CAS Reg. No. [192268-64-7]); N-(2,2,6,6-tetramethyl-4-piperidyl)-n-dodecylsuccinimide, N-(1,2,2,6,6-pentamethyl-4-piperidyl)-n-dodecylsuccinimide, 2-undecyl-7,7,9,9-tetramethyl-1-oxa-3,8-diaza-4-oxo-spiro[4,5]decane, a reaction product of 7,7,9,9-tetramethyl-2-cycloundecyl-1-oxa-3,8-diaza-4-oxospiro-[4,5]decane and epichlorohydrin, 1,1-bis(1,2,2,6,6-pentamethyl-4-piperidyloxycarbonyl)-2-(4-methoxyphenyl)ethene, N,N'-bis-formyl-N,N'-bis(2,2,6,6-tetramethyl-4-piperidyl) hexamethylenediamine, a diester of 4-methoxymethylenemalonic acid with 1,2,2,6,6-pentamethyl-4-hydroxypiperidine, poly[methylpropyl-3-oxy-4-(2,2,6,6-tetramethyl-4-piperidyl)]siloxane, a reaction product of maleic acid anhydride-α-olefin copolymer with 2,2,6,6-tetramethyl-4-aminopiperidine or 1,2,2,6,6-pentamethyl-4-aminopiperidine.

2.7. Oxamides, for example 4,4'-dioctyloxyoxanilide, 2,2'-diethoxyoxanilide, 2,2'-dioctyloxy-5,5'-di-tert-butoxanilide, 2,2'-didodecyloxy-5,5'-di-tert-butoxanilide, 2-ethoxy-2'-ethyloxanilide, N,N'-bis(3-dimethylaminopropyl) oxamide, 2-ethoxy-5-tert-butyl-2'-ethoxanilide and its mixture with 2-ethoxy-2'-ethyl-5,4'-di-tert-butoxanilide, mixtures of o- and p-methoxy-disubstituted oxanilides and mixtures of o- and p-ethoxy-disubstituted oxanilides.

2.8. 2-(2-Hydroxyphenyl)-1,3,5-triazines, for example 2,4,6-tris(2-hydroxy-4-octyloxyphenyl)-1,3,5-triazine, 2-(2-hydroxy-4-octyloxyphenyl)-4,6-bis(2,4-dimethylphenyl)-1,3,5-triazine, 2-(2,4-dihydroxyphenyl)-4,6-bis(2,4-dimethylphenyl)-1,3,5-triazine, 2,4-bis(2-hydroxy-4-propyloxy phenyl)-6-(2,4-dimethylphenyl)-1,3,5-triazine, 2-(2-hydroxy-4-octyloxyphenyl)-4,6-bis(4-methylphenyl)-1,3,5-triazine, 2-(2-hydroxy-4-dodecyloxyphenyl)-4,6-bis(2,4-dimethylphenyl)-1,3,5-triazine, 2-(2-hydroxy-4-tridecyloxyphenyl)-4,6-bis(2,4-dimethylphenyl)-1,3,5-triazine, 2-[2-hydroxy-4-(2-hydroxy-3-butyloxypropoxy)phenyl]-4,6-bis(2,4-dimethyl)-1,3,5-triazine, 2-[2-hydroxy-4-(2-hydroxy-3-octyloxypropyloxy)phenyl]-4,6-bis(2,4-dimethyl)-1,3,5-triazine, 2-[4-(dodecyloxy/tridecyloxy-2-hydroxypropoxy)-2-hydroxyphenyl]-4,6-bis(2,4-dimethylphenyl)-1,3,5-triazine, 2-[2-hydroxy-4-(2-hydroxy-3-dodecyloxypropoxy)phenyl]-4,6-bis(2,4-dimethylphenyl)-1,3,5-triazine, 2-(2-hydroxy-4-hexyloxy)phenyl-4,6-diphenyl-1,3,5-triazine, 2-(2-hydroxy-4-methoxyphenyl)-4,6-diphenyl-1,3,5-triazine, 2,4,6-tris[2-hydroxy-4-(3-butoxy-2-hydroxy propoxy)phenyl]-1,3,5-triazine, 2-(2-hydroxyphenyl)-4-(4-methoxyphenyl)-6-phenyl-1,3,5-triazine, 2-{2-hydroxy-4-[3-(2-ethylhexyl-1-oxy)-2-hydroxypropyloxy]phenyl}-4,6-bis 2,4-dimethylphenyl)-1,3,5-triazine.

3. Metal deactivators, for example N,N'-diphenyloxamide, N-salicylal-N'-salicyloyl hydrazine, N,N'-bis(salicyloyl) hydrazine, N,N'-bis(3,5-di-tert-butyl-4-hydroxyphenylpropionyl)hydrazine, 3-salicyloylamino-1,2,4-triazole, bis(benzylidene)oxalyl dihydrazide, oxanilide, isophthaloyl dihydrazide, sebacoyl bisphenylhydrazide, N,N'-diacetyladipoyl dihydrazide, N,N'-bis(salicyloyl)oxalyl dihydrazide, N,N'-bis(salicyloyl)thiopropionyl dihydrazide.

4. Hydroxylamines, for example N,N-dibenzylhydroxylamine, N,N-diethylhydroxylamine, N,N-dioctylhydroxylamine, N,N-dilaurylhydroxylamine, N,N-ditetradecylhydroxylamine, N,N-dihexadecylhydroxylamine, N,N-dioctadecylhydroxylamine, N-hexadecyl-N-octadecylhydroxylamine, N-heptadecyl-N-octadecylhydroxylamine, N,N-dialkylhydroxylamine derived from hydrogenated tallow amine.

5. Nitrones, for example N-benzyl-alpha-phenylnitrone, N-ethyl-alpha-methylnitrone, N-octyl-alpha-heptylnitrone, N-lauryl-alpha-undecylnitrone, N-tetradecyl-alpha-tridecylnitrone, N-hexadecyl-alpha-pentadecylnitrone, N-octadecyl-alpha-heptadecylnitrone, N-hexadecyl-alpha-heptadecylnitrone, N-ocatadecyl-alpha-pentadecylnitrone, N-heptadecyl-alpha-heptadecylnitrone, N-octadecyl-alpha-hexadecylnitrone, nitrone derived from N,N-dialkylhydroxylamine derived from hydrogenated tallow amine.

6. Thiosynergists, for example dilauryl thiodipropionate or distearyl thiodipropionate.

7. Peroxide scavengers, for example esters of β-thiodipropionic acid, for example the lauryl, stearyl, myristyl or tridecyl esters, mercaptobenzimidazole or the zinc salt of 2-mercaptobenzimidazole, zinc dibutyldithiocarbamate, dioctadecyl disulfide, pentaerythritol tetrakis(β-dodecylmercapto)propionate.

8. Polyamide stabilisers, for example copper salts in combination with iodides and/or phosphorus compounds and salts of divalent manganese.

9. Basic co-stabilisers, for example melamine, polyvinylpyrrolidone, dicyandiamide, triallyl cyanurate, urea derivatives, hydrazine derivatives, amines, polyamides, polyurethanes, alkali metal salts and alkaline earth metal salts of higher fatty acids, for example calcium stearate, zinc stearate, magnesium behenate, magnesium stearate, sodium ricinoleate and potassium palmitate, antimony pyrocatecholate or zinc pyrocatecholate.

10. Nucleating agents, for example inorganic substances, such as talcum, metal oxides, such as titanium dioxide or magnesium oxide, phosphates, carbonates or sulfates of, preferably, alkaline earth metals; organic compounds, such as mono- or polycarboxylic acids and the salts thereof, e.g. 4-tert-butylbenzoic acid, adipic acid, diphenylacetic acid, sodium succinate or sodium benzoate; polymeric compounds, such as ionic copolymers (ionomers). Especially preferred are 1,3:2,4-bis(3',4'-dimethylbenzylidene)sorbitol, 1,3:2,4-di(paramethyldibenzylidene)sorbitol, and 1,3:2,4-di(benzylidene)sorbitol.

11. Fillers and reinforcing agents, for example calcium carbonate, silicates, glass fibres, glass bulbs, asbestos, talc, kaolin, mica, barium sulfate, metal oxides and hydroxides, carbon black, graphite, wood flour and flours or fibers of other natural products, synthetic fibers.

12. Other additives, for example plasticisers, lubricants, emulsifiers, pigments, rheology additives, catalysts, flow-control agents, optical brighteners, flameproofing agents, antistatic agents and blowing agents.

The costabilizers are added, for example, in concentrations of 0.01 to 10%, relative to the total weight of the synthetic polymer to be stabilized.

Preferred further additives are modification agents for nanocomposites, compatibilizers, light-stabilizers, dispersing or solvating agents, pigments, dyes, plasticizers and/or toughening agents.

In addition to the nano fillers other fillers may be used as reinforcing agents (item 11 in the list), for example talc, calcium carbonate, mica or kaolin. These are added to the synthetic polymers in concentrations, for example, of from 0.01 to 40%, based on the overall weight of the synthetic polymers to be stabilized.

The fillers and reinforcing agents (item 11 in the list), for example metal hydroxides, especially aluminium hydroxide or magnesium hydroxide, are added to the synthetic polymers in concentrations, for example, of from 0.01 to 60%, based on the overall weight of the synthetic polymers to be stabilized.

Carbon black as filler is added to the synthetic polymers in concentrations, judiciously, of from 0.01 to 5%, based on the overall weight of the synthetic polymers to be stabilized.

Glass fibers as reinforcing agents are added to the synthetic polymers in concentrations, judiciously, of from 0.01 to 20%, based on the overall weight of the synthetic polymers to be stabilized.

Further preferred compositions comprise in addition to components (a), (b), (c) and (d) further additives as well, especially alkaline earth metal salts of higher fatty acids, for example calcium stearate.

Especially preferred further additives are modification agents for nanocomposites as outlined at the beginning of the description, compatibilizers and/or metal passivators.

Compatibilizers are mediators between a hydrophobic and a hydrophyllic phase. Preferably, compatibilizers are polymeric dispersing or solvating agents having amphiphilic properties.

Of interest as compatibilizers are block-graft copolymers like for example maleic anhydride grafted polypropylene (PP-g-MA), ithaconic acid grafted polypropylene, acrylic acid grafted polypropylene or polyethyleneoxide-block-polystyrene (PEO-bl-PS). Preferably, block-graft copolymers have molecular weights of $M_n$ 1000 to 100000, and for the maleic anhydride modified polypropylene oligomers (PP-g-MA) the maleic anhydride content is from 0.1 to 10% [for example Epolene® E43, MA content 2.9 weight %, Mn 8800 (Eastman); Hostaprime® HC5, MA content 4.2 weight %, Mn 4000]. A compatibilizer of special interest is maleic anhydride grafted polypropylene (PP-g-MA).

Polymeric dispersing or solvating agents having amphiphilic properties are polymeric dispersing or solvating agents which have polar and nonpolar groups in the same molecule and they are, for example, dispersing or solvating agents based on polyethylene glycols (PEG), polyacrylates, polysiloxanes, polyvinyl acetate or on block copolymers containing at least one block copolymer based on acrylate, acrylic acid or methacrylate.

Polymeric dispersing or solvating agents of interest having amphiphilic properties have at least two different polarities within one polymer molecule. Oligomeric structures are also possible. They are usually copolymers, for example random copolymers, or block copolymers which can be prepared by known polymerisation reactions, for example by radical or anionic polymerisation, by polycondensation reactions, such as by reaction of end-functionalised oligomeric or comb polymers, which polymers may be prepared e.g. by graft reaction. Block copolymers are, for example, diblock copolymers (A-B type) or triblock copolymers (A-B-A or A-B-C type) and so-called tapered structures.

Diblock copolymers (A-B type) are, for example, poly(styrene-b-methylmethacrylate), poly(styrene-b-tert-butylmethacrylate), poly(styrene-b-methylacrylate), poly(styrene-b-n-butylacrylate), poly(styrene-b-tert-butylacrylate), poly(styrene-b-butadiene), poly(styrene-b-isoprene[1,4-addition]), tapered block copolymer poly(styrene-b-butadiene), tapered block copolymer poly(styrene-b-ethylene), poly(styrene-b-2-vinylpyridine), poly(styrene-b-4-vinyl-pyridine), poly(styrene-bis-tert-butylstyrene), poly(styrene-b-dimethylsiloxane), poly(butadiene-b-dimethylsiloxane), poly(butadiene[1,4-addition]-b-methylmethacrylate), poly(isoprene[1-4-addition]-b-methylmethacrylate), poly(butadiene-b-tert-butylmethacrylate), poly(butadiene-b-tert-butylacrylate), poly(isoprene-b-2-vinylpyridine), poly(butadiene-b-4-vinylpyridine), poly(styrene-b-methylmethacrylate), poly(methylmethacrylate-b-tert-butylmethacrylate), poly(methylmethacrylate-b-tert-butylacrylate), poly(tert-butylacrylate-b-methylmethacrylate), poly(n-butylacrylate-b-methylmethacrylate), poly(2-vinylpyridine-b-methylmethacrylate), poly(tert-butylmethacrylate-b-tert-butylacrylate), poly(tert-butylmethacrylate-b-2-vinylpyridine), poly(tert-butylmethacrylate-b-4-vinylpyridine), poly(tert-butylacrylate-b-2-vinylpyridine), poly(2-vinylpyridine-b-4-vinylpyridine), poly(ethylene-b-methylmethacrylate), poly(ethylene-b-2-vinylpyridine) or poly(ethylene-b-4-vinylpyridine).

Triblock copolymers of the A-B-A type are, for example, poly(methylmethacrylate-b-styrene-b-methylmethacrylate), poly(tert-butylmethacrylate-b-styrene-b-tert-butylmethacrylate), poly(tert-butylacrylate-b-styrene-b-tert-butylacrylate), poly(2-vinylpyridine-b-styrene-b-tert-butylacrylate), poly(4-vinylpyridine-b-styrene-b-4-vinylpyridine), poly(butadiene[1,2-addition]-b-styrene-b-butadiene[1,2-addition]), poly(butadiene[1,4-addition]-b-styrene-b-butadiene[1,4-addition]), poly(styrene-b-butadiene[1,4- and 1,2-addition]-b-styrene), poly(methylmethacrylate-b-butadiene[1,4- or 1,2-addition]-b-methylmethacrylate), poly(tert-butylmethacrylate-b-methylmethacrylate-b-tert-butylmethacrylate), poly(tert-butylacrylate-b-methylmethacrylate-b-tert-butylacrylate), poly(methylmethacrylate-b-2-vinylpyridine-b-methylmethacrylate), poly(4-vinylpyridine-b-methylmethacrylate-b-4-vinylpyridine), poly(methylmethacrylate-b-tert-butylacrylate-b-methylmethacrylate), poly(methylmethacrylate-b-n-butylacrylate-b-methylmethacrylate), poly(tert-butylmethacrylate-b-tert-butylacrylate-b-tert-butylmethacrylate), poly(2-vinylpyridine-b-tert-butylacrylate-b-2-vinylpyridine), poly(4-vinylpyridine-b-tert-butylacrylate-b-4-vinylpyridine), poly(styrene-b-n-butylacrylate-b-styrene), poly(styrene-b-ethylacrylate-b-styrene), poly(styrene-b-ethylene-b-styrene), poly(styrene-b-butylene-b-styrene), poly(ethylene oxide-b-styrene-b-ethylene oxide), poly(styrene-b-ethylene oxide-b-styrene) or poly(styrene-b-acrylic acid-b-styrene).

Triblock copolymers of the A-B-C type are, for example, poly(styrene-b-butadiene-b-2-vinylpyridine), poly(styrene-b-butadiene-b-4-vinylpyridine), poly(styrene-b-tert-butylmethacrylate-b-2-vinylpyridine), poly(styrene-b-tert-butylmethacrylate-b-4-vinylpyridine), poly(styrene-b-2-vinylpyridine-b-4-vinylpyridine), poly(butadiene-b-styrene-b-methylmethacrylate), poly(styrene-b-butadiene-b-methylmethacrylate), poly(styrene-b-2-vinylpyridine-b-ethyl oxide), poly(styrene-b-tert-butylacrylate-b-methylmethacrylate), poly(styrene-b-acrylic acid-b-methylmethacrylate), poly(styrene-b-a-methylstyrene-b-methylmethacrylate) or poly(styrene-b-a-methylstyrene-b-tert-butylacrylate).

Long-chain block copolymers of particular interest have a chain length of more than 10 carbon atoms, preferably of $C_{12}$-$C_{18}$carbon atoms.

Particularly suitable dispersing or solvating agents having amphiphilic properties are, for example, poly(butadienemethylmethacrylate), poly(isoprenemethylmethacrylate), poly(ethylenemethylmethacrylate), poly(styrene-4-vinylpyridine), poly(styrene-2-vinylpyridine), poly(styrene-n-butylacrylate), poly(styrene-tert-butylacrylate), poly(styrene sodium acrylate), poly(styrene-acrylic acid), poly(methylmethacrylate sodium acrylate), poly(methylmethacrylate sodium methacrylate), poly(ethylene oxide-ϵ-caprolactone), poly(2-vinylpyridine ethylene oxide), poly(butadiene-ethylene oxide), poly(butadiene sodium acrylate), poly(ethylene-ethylene oxide), poly(ethylene-propylene oxide), poly(styrene-ethylacrylate-styrene), poly(ethylene oxide-styrene-ethylene oxide), poly(styrene-acrylic acid-styrene), poly(styrenebutadienemethylmethacrylate), poly(styrene-vinylpyridine-ethylene oxide), poly(styrene-4-vinylbenzoic acid), poly(styrene-polyglycidyl-methacrylate), poly(ethylene-glycidyl methacrylate), poly(propylene acrylic acid), poly(ethylene acrylic acid), poly(propylenemaleic anhydride), poly(ethylenemaleic anhydride), poly(styrenemaleic anhydride), polymethacrylic acid-polyalkylene oxide block copolymers, for example according to EP-A-0 859 028, polysiloxane-polyoxyalkylene, copolymers of maleates and styrene or styrene derivatives, for example according to EP-A-0 791 024, polystyrene-polysiloxane block copolymers, polyacrylate-polysiloxane block copolymers and cyclosiloxane-radiale copolymers, prepared e.g. using ATRP technology according to EP-A-0 870 774, methylacrylate-styrene copolymer, methylmethacrylate-styrene, polybutadiene-methylacrylates, prepared by nitroxyl-initiated radical polymerisation according to EP-A-0 135 280.

The polyalkylene oxides are preferably polyethylene oxide, polypropylene oxide and polybutylene oxide.

Suitable block copolymers are, for example, polyacrylate/polystyrene, polymethacrylate/polyethylene oxide, polyacrylate/polyethylene oxide, polyacrylate/polyethylene, polyvinyl acetate/polyethylene, polystyrene/polybutadiene, polyacrylate/polybutadiene, polyacrylate/polyisoprene, polyisoprene/polymethylmethacrylate, polyethylene/polymethylmethacrylate, polyethylene/polyethylene oxide or polyethylene/polypropylene oxide.

Particularly suitable dispersing or solvating agents having amphiphilic properties are, for example, poly(styrene-bis-sodium acrylate), poly(styrene-bis-acrylic acid), poly(styrene-bis-sodium methacrylate), poly(styrene-bis-N-methyl-4-vinylpyridinium iodide), poly(isoprene-bis-N-methyl-2-vinylpyridinium iodide), poly(styrene-bis-ethylene oxide), poly(methylmethacrylate-bis-sodium acrylate), poly(methylmethacrylate-bis-sodium methacrylate), poly(methylmethacrylate-bis-ethylene oxide), poly(tert-butylmethacrylate-bis-ethylene oxide), poly(methylmethacrylate-bis-N-methyl-4-vinylpyridinium iodide), poly(ethylene oxide-bis-lactate), poly(2-vinylpyridine-bis-ethylene oxide), poly(butadiene-bis-sodium acrylate), poly(butadiene-bis-sodium methacrylate), poly(butadiene-bis-N-methyl-4-vinylpyridinium iodide), poly(butadiene-bis-ethylene oxide), poly(ethylene-bis-ethylene oxide) or poly(ethylene-bis-propylene oxide).

Particularly preferred polysiloxanes containing long-chain side groups are disclosed, inter alia, in U.S. Pat. No. 5,387,467.

Other likewise preferred dispersing or solvating agents based on polyacrylates are described, inter alia, in U.S. Pat. No. 5,133,898.

Particularly preferred dispersing or solvating agents based on acrylate are, for example, Tegomer®DA 100, Tegomer®DA 102 or Wax P 121®, of Th. Goldschmidt AG, Germany.

As a conventional stabilizer combination for processing synthetic polymers, for example polyolefins, to form corresponding mouldings, the combination of a phenolic antioxidant with a secondary antioxidant based on an organic phosphite or phosphonite is recommended.

Incorporation of components (b), (c) and (d) and, if desired, further additives into the synthetic polymers is carried out by known methods, for example before or during moulding or else by applying the dissolved or dispersed compounds to the synthetic polymer, if appropriate with subsequent slow evaporation of the solvent. Components (b), (c) and (d) can also be added to the synthetic polymers to be stabilized in the form of a masterbatch or concentrate containing them, for example, in a concentration of 2.5 to 25% by weight.

The present invention also relates to a nanocomposite material in the form of a masterbatch comprising component (b) in an amount of from 0.03 to 90%, based on the weight of component (a), component (c) in an amount of from 0.03 to 15%, based on the weight of component (a), and component (d) in amount of from 0.03 to 15%, based on the weight of component (a).

Components (b), (c) and (d) and, if desired, further additives, can also be added before or during polymerisation or before crosslinking.

Components (b), (c) and (d), with or without further additives, can be incorporated in pure form or encapsulated in waxes, oils or polymers into the synthetic polymer that is to be stabilized.

Components (b), (c) and (d), with or without further additives, can also be sprayed onto the synthetic polymer that is to be stabilized. It is able to dilute other additives (for example the conventional additives indicated above) or their melts so that they too can be sprayed together with these additives onto the polymer that is to be stabilized. Addition by spraying on during the deactivation of the polymerization catalysts is particularly advantageous, it being possible to carry out spraying using, for example, the steam used for deactivation.

In the case of spherically polymerized polyolefins it may, for example, be advantageous to apply components (b), (c) and (d), with or without other additives, by spraying.

The nanocomposite materials stabilized in this way can be employed in a wide variety of forms, for example as foams, films, fibres, tapes, moulding compositions, as profiles or as binders for coating materials, especially powder coatings, adhesives or putties.

The synthetic polymers stabilized in this way can likewise be employed in a wide variety of forms, especially as thick-layer polyolefin mouldings which are in long-term contact with extractive media, such as, for example, pipes for liquids or gases, films, fibres, geomembranes, tapes, profiles or tanks.

The preferred thick-layer polyolefin mouldings have a layer thickness of from 1 to 50 mm, in particular from 1 to 30 mm, for example from 2 to 10 mm.

The nanocomposite materials according to the invention can be advantageously used for the preparation of various shaped articles. Examples are:

I-1) Floating devices, marine applications, pontoons, buoys, plastic lumber for decks, piers, boats, kayaks, oars, and beach reinforcements.

I-2) Automotive applications, in particular bumpers, dashboards, battery, rear and front linings, moldings parts under the hood, hat shelf, trunk linings, interior linings, air bag covers, electronic moldings for fittings (lights), panes for dashboards, headlamp glass, instrument panel, exterior linings, upholstery, automotive lights, head lights, parking lights, rear lights, stop lights, interior and exterior trims; door panels; gas tank; glazing front side; rear windows; seat backing, exterior panels, wire insulation, profile extrusion for sealing, cladding, pillar covers, chassis parts, exhaust systems, fuel filter/filler, fuel pumps, fuel tank, body side mouldings, convertible tops, exterior mirrors, exterior trim, fasteners/fixings, front end module, glass, hinges, lock systems, luggage/roof racks, pressed/stamped parts, seals, side impact protection, sound deadener/insulator and sunroof.

I-3) Road traffic devices, in particular sign postings, posts for road marking, car accessories, warning triangles, medical cases, helmets, tires.

I-4) Devices for plane, railway, motor car (car, motorbike) including furnishings.

I-5) Devices for space applications, in particular rockets and satellites, e.g. reentry shields.

I-6) Devices for architecture and design, mining applications, acoustic quietized systems, street refuges, and shelters.

II-1) Appliances, cases and coverings in general and electric/electronic devices (personal computer, telephone, portable phone, printer, television-sets, audio and video devices), flower pots, satellite TV bowl, and panel devices.

II-2) Jacketing for other materials such as steel or textiles.

II-3) Devices for the electronic industry, in particular insulation for plugs, especially computer plugs, cases for electric and electronic parts, printed boards, and materials for electronic data storage such as chips, check cards or credit cards.

II-4) Electric appliances, in particular washing machines, tumblers, ovens (microwave oven), dish-washers, mixers, and irons.

II-5) Covers for lights (e.g. street-lights, lamp-shades).

II-6) Applications in wire and cable (semi-conductor, insulation and cable-jacketing).

II-7) Foils for condensers, refrigerators, heating devices, air conditioners, encapsulating of electronics, semi-conductors, coffee machines, and vacuum cleaners.

III-1) Technical articles such as cogwheel (gear), slide fittings, spacers, screws, bolts, handles, and knobs.

III-2) Rotor blades, ventilators and windmill vanes, solar devices, swimming pools, swimming pool covers, pool liners, pond liners, closets, wardrobes, dividing walls, slat walls, folding walls, roofs, shutters (e.g. roller shutters), fittings, connections between pipes, sleeves, and conveyor belts.

III-3) Sanitary articles, in particular shower cubicles, lavatory seats, covers, and sinks.

III-4) Hygienic articles, in particular diapers (babies, adult incontinence), feminine hygiene articles, shower curtains, brushes, mats, tubs, mobile toilets, tooth brushes, and bed pans.

III-5) Pipes (cross-linked or not) for water, waste water and chemicals, pipes for wire and cable protection, pipes for gas, oil and sewage, guttering, down pipes, and drainage systems.

III-6) Profiles of any geometry (window panes) and siding.

III-7) Glass substitutes, in particular extruded plates, glazing for buildings (monolithic, twin or multiwall), aircraft, schools, extruded sheets, window film for architectural glazing, train, transportation, sanitary articles, and greenhouse.

III-8) Plates (walls, cutting board), extrusion-coating (photographic paper, tetrapack and pipe coating), silos, wood substitute, plastic lumber, wood composites, walls, surfaces, furniture, decorative foil, floor coverings (interior and exterior applications), flooring, duck boards, and tiles.

III-9) Intake and outlet manifolds.

III-10) Cement-, concrete-, composite-applications and covers, siding and cladding, hand rails, banisters, kitchen work tops, roofing, roofing sheets, tiles, and tarpaulins.

IV-1) Plates (walls and cutting board), trays, artificial grass, astroturf, artificial covering for stadium rings (athletics), artificial floor for stadium rings (athletics), and tapes.

IV-2) Woven fabrics continuous and staple, fibers (carpets/hygienic articles/geotextiles/monofilaments; filters; wipes/curtains (shades)/medical applications), bulk fibers (applications such as gown/protection clothes), nets, ropes, cables, strings, cords, threads, safety seat-belts, clothes, underwear, gloves; boots; rubber boots, intimate apparel, garments, swimwear, sportswear, umbrellas (parasol, sunshade), parachutes, paraglides, sails, "balloon-silk", camping articles, tents, airbeds, sun beds, bulk bags, and bags.

IV-3) Membranes, insulation, covers and seals for roofs, tunnels, dumps, ponds, dumps, walls roofing membranes, geomembranes, swimming pools, curtains (shades)/sunshields, awnings, canopies, wallpaper, food packing and wrapping (flexible and solid), medical packaging (flexible & solid), airbags/safety belts, arm- and head rests, carpets, centre console, dashboard, cockpits, door, overhead console module, door trim, headliners, interior lighting, interior mirrors, parcel shelf, rear luggage cover, seats, steering column, steering wheel, textiles, and trunk trim.

V) Films (packaging, dump, laminating, agriculture and horticulture, greenhouse, mulch, tunnel, silage), bale wrap, swimming pools, waste bags, wallpaper, stretch film, raffia, desalination film, batteries, and connectors.

VI-1) Food packing and wrapping (flexible and solid), bottles.

VI-2) Storage systems such as boxes (crates), luggage, chest, household boxes, pallets, shelves, tracks, screw boxes, packs, and cans.

VI-3) Cartridges, syringes, medical applications, containers for any transportation, waste baskets and waste bins, waste bags, bins, dust bins, bin liners, wheely bins, container in general, tanks for water/used water/chemistry/gas/oil/gasoline/diesel; tank liners, boxes, crates, battery cases, troughs, medical devices such as piston, ophthalmic applications, diagnostic devices, and packing for pharmaceuticals blister.

VII-1) Extrusion coating (photo paper, tetrapack, pipe coating), household articles of any kind (e.g. appliances, thermos bottle/clothes hanger), fastening systems such as plugs, wire and cable clamps, zippers, closures, locks, and snap-closures.

VII-2) Support devices, articles for the leisure time such as sports and fitness devices, gymnastics mats, ski-boots, inline-skates, skis, big foot, athletic surfaces (e.g. tennis grounds); screw tops, tops and stoppers for bottles, and cans.

VII-3) Furniture in general, foamed articles (cushions, impact absorbers), foams, sponges, dish clothes, mats, garden chairs, stadium seats, tables, couches, toys, building kits (boards/figures/balls), playhouses, slides, and play vehicles.

VI 1-4) Materials for optical and magnetic data storage.

VII-5) Kitchen ware (eating, drinking, cooking, storing).

VII-6) Boxes for CD's, cassettes and video tapes; DVD electronic articles, office supplies of any kind (ball-point pens, stamps and ink-pads, mouse, shelves, tracks), bottles of any volume and content (drinks, detergents, cosmetics including perfumes), and adhesive tapes.

VII-7) Footwear (shoes/shoe-soles), insoles, spats, adhesives, structural adhesives, food boxes (fruit, vegetables, meat, fish), synthetic paper, labels for bottles, couches, artificial joints (human), printing plates (flexographic), printed circuit boards, and display technologies.

VII-8) Devices of filled polymers (talc, chalk, china clay (kaolin), wollastonite, pigments, carbon black, $TiO_2$, mica, nanocomposites, dolomite, silicates, glass, asbestos).

Thus, a further embodiment of the present invention relates to a shaped article, in particular a film, pipe, profile, bottle, tank or container, fiber containing a nanocomposite material as described above.

A further embodiment of the present invention relates to a molded article containing a nano-composite material as described above. The molding is in particular effected by injection, blow, compression, roto-molding or slush-molding or extrusion.

The present invention also relates to a process for stabilizing a synthetic polymer against oxidative, thermal or light-induced degradation, which comprises incorporating in or applying to said material at least one each of components (b), (c) and (d), with or without further additives.

A preferred embodiment of the present invention is therefore the use of a mixture of components (b), (c) and (d), with or without further additives, as stabilizers for synthetic polymers against oxidative, thermal or light-induced degradation.

The preferred components (b), (c) and (d) in the process for stabilizing a synthetic polymer and the use thereof as stabilizers for synthetic polymers against oxidative, thermal or light-induced degradation are the same as those described for the nanocomposite material.

The following examples illustrate the invention further. Parts or percentages relate to weight.

EXAMPLE 1

Stabilization of Polypropylene 1.5 kg of polypropylene powder (Profax®PH 350, Basell Polyolefins, Germany) are mixed to homogeneity in a high-speed mixer with 5% of Nanofil®N15 (distearyldimethylammonium chloride modified nanodispersed layered silicate clay, Süd-Chemie AG, Germany), 15% of Polybond®3200 (maleic anhydride grafted polypropylene, Crompton Europe Ltd., UK), 0.1% of calciumstearate and with the additives listed in Table 1. This blend is then extruded in a twin-screw extruder, of Berstorff, at a temperature of at most 200° C. After drawing the extrudate through a waterbath to cool, it is granulated. 80×90 mm and 2 mm thick test panels are then moulded from these granules by means of an injection moulding machine (Arburg 320 S) at a temperature of at most 235° C. The oven aging of the test panels is carried out in a Memmert convection oven at 135° C. for 5 days. The ΔYellowness Index (YI) [YI after 5 days minus YI at the beginning of the test] of these test panels is determined in accordance with ASTM D 1925-70. Low YI values signify little discoloration, high YI values strong discoloration of the samples. The less discoloration, the more effective the stabilizer or stabilizer blend. The results are compiled in Table 1.

An other group of test panels are subjected to artificial ageing at 135° C. in a fan-assisted oven until they become brittle. The results are summarized in Table 1. The longer it takes, the better the stabilization.

TABLE 1

| Examples | Additives | α Yellowness Index | Oven aging Days until embrittlement |
|---|---|---|---|
| Example 1a[a] | — | 23.7 | 14 |
| Example 1b[a] | 0.50% Irgafos 168 (RTM)[c] | 21.0 | 16 |
| Example 1c[a] | 0.50% Irganox 1010 (RTM)[d] | 35.4 | 33 |
| Example 1d[a] | 0.25% Irgafos 168 (RTM)[c] 0.25% Irganox 1010 (RTM)[d] | 34.9 | 26 |
| Example 1e[b] | 0.25% Irgafos 168 (RTM)[c] 0.25% Araldite GT 7072 (RTM)[e] | 17.1 | 19 |
| Example 1f[b] | 0.25% Irganox 1010 (RTM)[d] 0.25% Araldite GT 7072 (RTM)[e] | 30.1 | 30 |
| Example 1g[b] | 0.125% Irgafos 168 (RTM)[c] 0.125% Irganox 1010 (RTM)[d] 0.25% Araldite GT 7072 (RTM)[e] | 26.5 | 23 |
| Example 1h[b] | 0.25% Irgafos 168 (RTM)[c] 0.25% Irganox 1010 (RTM)[d] 0.25% Araldite GT 7072 (RTM)[e] | 28.8 | 33 |
| Example 1i[b] | 0.50% Irgafos 168 (RTM)[c] 0.50% Araldite GT 7072 (RTM)[e] | 15.1 | 30 |
| Example 1j[b] | 0.50% Irganox 1010 (RTM)[d] 0.50% Araldite GT 7072 (RTM)[e] | 21.6 | >37 |
| Example 1k[b] | 0.25% Irgafos 168 (RTM)[c] 0.25% Irganox 1010 (RTM)[d] 0.50% Araldite GT 7072 (RTM)[e] | 15.8 | >37 |
| Example 1l[b] | 0.125% Irgafos 168 (RTM)[c] 0.125% Irganox 1010 (RTM)[d] 0.75% Araldite GT 7072 (RTM)[e] | 14.4 | >37 |

[a]Comparative Example.
[b]Example according to the invention.
[c]Irgafos 168 (RTM) (Ciba Specialty Chemicals Inc.) is tris(2,4-di-tert-butylphenyl) phosphite.
[d]Irganox 1010 (RTM) (Ciba Specialty Chemicals Inc.) is a compound of the formula AO-1

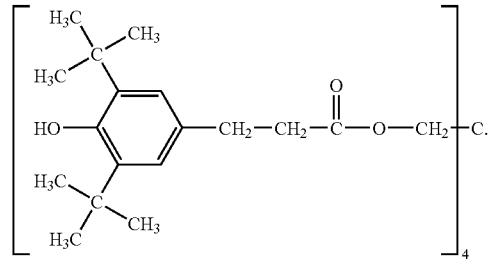

(AO-1)

[e]Araldite GT 7072 (RTM) (Vantico, Switzerland) is solid bisphenol A diglycidyl ether.

EXAMPLE 2

OIT Measurements of Polypropylene Nanocomposites 43.45 g Moplen HF 500 N (Basell Polyolefins, Germany), 15% Polybond®3000 (maleic anhydride grafted polypropylene, Crompton Europe Ltd., UK), 5% organic modified clay (Somasif®MTE (UNICOOPJAPAN LTD. (Duesseldorf), Germany) respectively Cloisite 20A (Southern Clay Products, Inc.)) and the appropriate amount of additives listed in table 2 are blended in a small vessel. The blends are mixed for 10 minutes at 200° C. in a brabender mixer (Plasticorder PL 2000-3 from brabender), pre-pressed with a hydraulic press from Fontijne and finally pressed at 200° C. into 60×60×1 mm plates. Ca. 25 mg of these plates are analysed by OIT (Oxidative-induction time, according to ASTM D 3895-80 at 190° C.) by aid of a Perkin Elmer DSC 7/3.5 Pyris. The measured OITs are listed in Table 2. A higher value for an OIT is related to a better stabilization of the sample.

TABLE 2

| Examples | Additives | OIT |
|---|---|---|
| Example 2a[a] | 0.1% Irganox B225 (RTM)[e] | 1.8 |
| Example 2b[b] | 0.1% Irganox B225 (RTM)[e] | 2.3 |
| Example 2c[c] | 0.50% Irganox 3114 (RTM)[f] 0.50% Araldite GT 7072 (RTM)[g] | 7.9 |
| Example 2d[c] | 0.25% Irganox HP 136 (RTM)[h] 0.25% Irganox 1010 (RTM)[i] 0.50% Araldite GT 7072 (RTM)[g] | 28.9 |
| Example 2e[d] | 0.50% Irganox 8225 (RTM)[e] 0.50% Araldite GT 7072 (RTM)[g] | 81.6 |
| Example 2f[d] | 0.50% Irganox B225 (RTM)[e] 0.50% Araldite MY 790 (RTM)[j] | 92.1 |
| Example 2g[d] | 0.50% Irganox 6225 (RTM)[e] 0.50% Araldite MT 0163 (RTM)[k] | 71.8 |
| Example 2h[d] | 0.50% Irganox 8225 (RTM)[e] 0.50% Benzophenone tetracarboxylic acid dianhydride (RTM)[l] | 46.6 |
| Example 2j[d] | 0.50% Irganox 8225 (RTM)[e] 0.50% Uvitex OB (RTM)[m] | 57.4 |

[a] Comparative Example including Somasif MTE (RTM)
[b] Comparative Example including Cloisite 20A (RTM)
[c] Example according to the invention (including Somasif MTE (RTM) (Tri octyl methyl ammonium modified synthetic mica)).
[d] Example according to the invention (including Cloisite 20A (RTM) (natural montmorillonite modified with a quaternary ammonium salt)).
[e] Irganox 8225 (RTM) (Ciba Specialty Chemicals Inc.) is a 1:1 blend of Irganox 1010 and Irgafos 168 (compare Example 1d).
[f] Irganox 3114 (RTM) (Ciba Specialty Chemicals Inc.) is 1,3,5-Tris-(3,5-di-tert butyl-4-hydroxybenzyl)-s-triazine2,4,6-(1h,3h,5h) trione.
[g] Araldite GT 7072 (RTM) (Vantico, Switzerland) is solid bisphenol A diglycidyl ether.
[h] Irganox HP 136 (RTM) (Ciba Specialty Chemicals Inc.) is a lactone based radical scavenger.
[i] Irganox 1010 (RTM) (Ciba Specialty Chemicals Inc.) is a compound of the formula AO-1

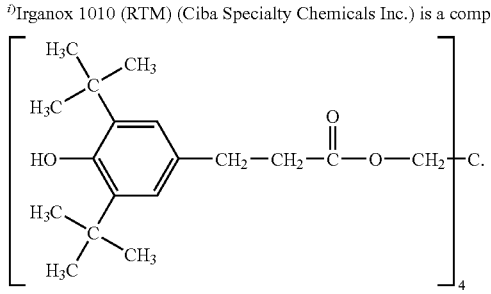

(AO-1)

[j] Araldite MY 790 (RTM) (Vantico, Switzerland) (bisphenol A based epoxide)
[k] Araldite MT 0163 (RTM) (Vantico, Switzerland) 1,1,2,2-ethanetetra-p-phenol based epoxide
[l] Benzophenone tetracaboxylic acide dianhydride (Merck KgaA, Darmstadt, Germany).
[m] Uvitex OB (Ciba Specialty Chemicals Inc.) (RTM) is 2,5-bis(5-tert-butyl-benzoxazol-2-yl) thiophene of the formula OX-1.

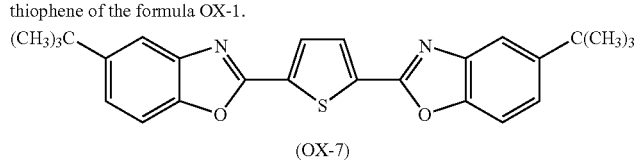

(OX-7)

EXAMPLE 3

OIT Measurements of Polyethylene Nanocomposites 52.20 g Hostalen GM 8255 (Hoechst AG, Frankfurt, Germany), 5% organic modified clay (Cloisite 20A (RTM) (natural montmorillonite modified with a quaternary ammonium salt from Southern Clay Products, Inc.)) and the appropriate amount of additives listed in Table 3 are premixed in a small vessel. The blends are mixed at 200° C. for 10 minutes in a brabender mixer (Plasticorder PL 2000-3 from brabender), pre-pressed with a hydraulic press from Fontijne and finally pressed at 200° C. into 60×60×1 mm plates. Ca. 25 mg of this plates have been analysed by OIT (Oxidative-induction time, according to ASTM D 3895-80 at 190° C.) by aid of a Perkin Elmer DSC 7/3.5 Pyris. The measured OITs are listed in Table 3. A higher value for an OIT is related to a better stabilization of the sample.

TABLE 3

| Examples | Additives | OIT |
| --- | --- | --- |
| Example 3a[a)] | 0.1000% Irganox B225 (RTM)[c)] | 40.3 |
| Example 3b[b)] | 0.3500% Araldite GT 7072 (RTM)[d)] | 64.5 |
| | 0.0375% Irganox 1010 (RTM)[e)] | |
| | 0.0375% Irgafos 168 (RTM)[f)] | |
| | 0.0150% Calcium stearate | |
| | 0.0600% Calcium oxide | |
| Example 3c[b)] | 0.5000% Irganox B225 (RTM)[c)] | 57.9 |
| | 0.5000% Araldite GT 7072 (RTM)[d)] | |

[a)]Comparative Example.
[b)]Example according to the invention
[c)]Irganox B225 (RTM) (Ciba Specialty Chemicals Inc.) is a 1:1 blend of Irganox 1010 and Irgafos 168 (compare example 1d).
[d)]Araldite GT 7072 (RTM) (Vantico, Switzerland) is solid bisphenol A diglycidyl ether.
[e)]Irganox 1010 (RTM) (Ciba Specialty Chemicals Inc.) is a compound of the formula AO-1

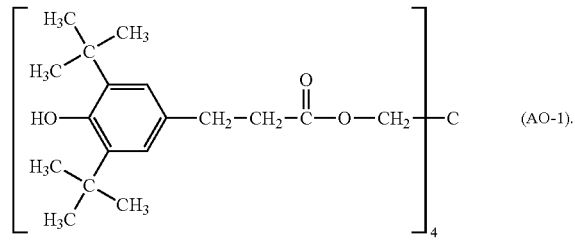

[f)]Irgafos 168 (RTM) (Ciba Specialty Chemicals Inc.) is tris(2,4-di-tert-butylphenyl) phosphite.

What is claimed is:

1. A nanocomposite material comprising
   a) a polyolefin,
   b) a natural or synthetic phyllosilicate or a mixture of such phyllosilicates in nanoparticles, which are modified by an ammonium or phosphonium compound,
   c) a phenolic antioxidant and a processing stabilizer, and
   d) bisphenol A diglycidyl ether, wherein the processing stabilizer is tris(2,4-di-tert-butylphenyl) phosphite and the phenolic antioxidant is of formula Ic

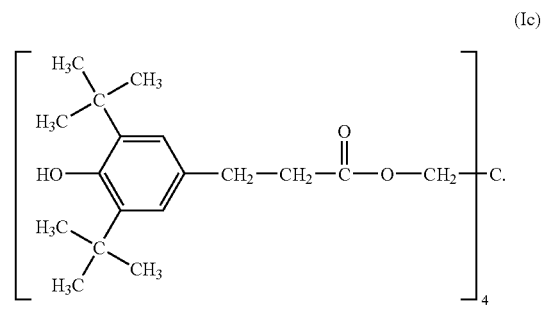

2. A nanocomposite material according to claim 1, wherein component (b) is a montmorillonite, bentonite, beidelite, mica, hectorite, saponite, nontronite, sauconite, vermiculite, ledikite, magadite, kenyaite, stevensite, volkonskoite or a mixture thereof in nanoparticles.

3. A nanocomposite material according to claim 1, wherein component (b) is present in an amount of from 0.01 to 30%, based on the weight of component (a).

4. A nanocomposite material according to claim 1, wherein component (c) is present in an amount of from 0.01 to 5%, based on the weight of component (a).

5. A nanocomposite material according to claim 1, wherein component (d) is present in an amount of from 0.01 to 5%, based on the weight of component (a).

6. A nanocomposite material according to claim 1, comprising in addition, besides components (a), (b), (c) and (d), further additives.

7. A nanocomposite material according to claim 6, comprising as further additives modification agents for nanocomposites, compatibilizers, light-stabilizers, dispersing or solvating agents, pigments, dyes, plasticizers or toughening agents.

8. A nanocomposite material according to claim 6, comprising as further additives modification agents for nanocomposites, compatibilizers or metal passivators.

9. A nanocomposite material according to claim 1 in the form of a masterbatch comprising component (b) in an amount of from 0.03 to 90%, based on the weight of component (a), component (c) in an amount of from 0.03 to 15%, based on the weight of component (a), and component (d) in amount of from 0.03 to 15%, based on the weight of component (a).

10. A process for stabilizing a polyolefin against oxidative, thermal or light-induced degradation, which comprises incorporating in or applying to said polyolefin at least one each of components (b), (c) and (d) according to claim 1.

* * * * *